United States Patent
Iwamoto

(10) Patent No.: US 10,855,779 B2
(45) Date of Patent: Dec. 1, 2020

(54) INFORMATION PROCESSING SYSTEM AND CONTROL METHOD

(71) Applicant: CANON KABUSHIKI KAISHA, Tokyo (JP)

(72) Inventor: Shohei Iwamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 16/181,207

(22) Filed: Nov. 5, 2018

(65) Prior Publication Data
US 2019/0149620 A1    May 16, 2019

(30) Foreign Application Priority Data

Nov. 16, 2017    (JP) ................................. 2017-221287

(51) Int. Cl.
| | | |
|---|---|---|
| *H04L 29/08* | (2006.01) | |
| *H04L 29/06* | (2006.01) | |
| *G06F 3/12* | (2006.01) | |
| *H04L 12/24* | (2006.01) | |

(52) U.S. Cl.
CPC ............ *H04L 67/16* (2013.01); *G06F 3/12* (2013.01); *H04L 41/00* (2013.01); *H04L 63/08* (2013.01); *H04L 67/10* (2013.01)

(58) Field of Classification Search
CPC .... G06F 3/1219; G06F 3/1222; G06F 3/1285; G06F 16/122; G06F 2221/2141; G06F 3/1238; G06F 3/1273; G06F 3/1288; G06F 3/1292; H04L 63/08; H04L 67/22; H04N 2201/0094
See application file for complete search history.

(56) References Cited

U.S. PATENT DOCUMENTS

| | | | | |
|---|---|---|---|---|
| 8,179,549 | B1 * | 5/2012 | Evans | H04N 1/00212 358/1.15 |
| 2010/0259778 | A1 * | 10/2010 | Kashioka | G06F 3/1222 358/1.14 |
| 2013/0155429 | A1 * | 6/2013 | Nakata | H04N 1/04 358/1.9 |
| 2015/0378648 | A1 * | 12/2015 | Yasukawa | G06F 3/1219 358/1.14 |
| 2016/0277930 | A1 * | 9/2016 | Li | H04L 41/28 |
| 2016/0344878 | A1 * | 11/2016 | Asthana | G06F 3/1222 |
| 2019/0058804 | A1 * | 2/2019 | Zhang | H04N 1/00811 |

FOREIGN PATENT DOCUMENTS

JP    2013-69244 A    4/2013

* cited by examiner

*Primary Examiner* — Hitesh Patel
(74) *Attorney, Agent, or Firm* — Canon U.S.A., Inc. IP Division

(57) ABSTRACT

There is provided an information processing system in which, when a service server receives a request for invalidating a cloud user authority to use a first function, the cloud user authority to use the first function is invalidated, and a local user authority is invalidated.

13 Claims, 25 Drawing Sheets

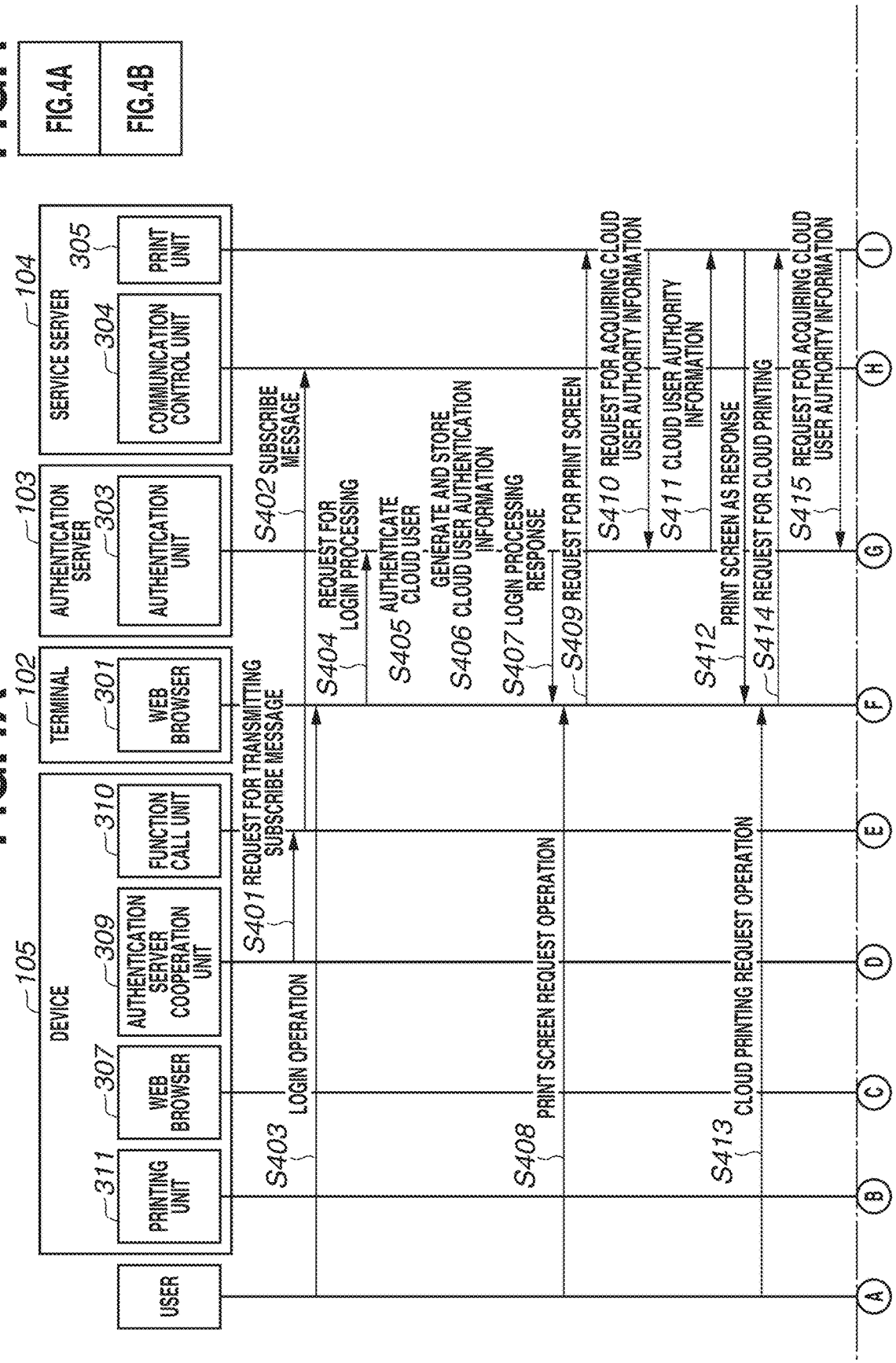

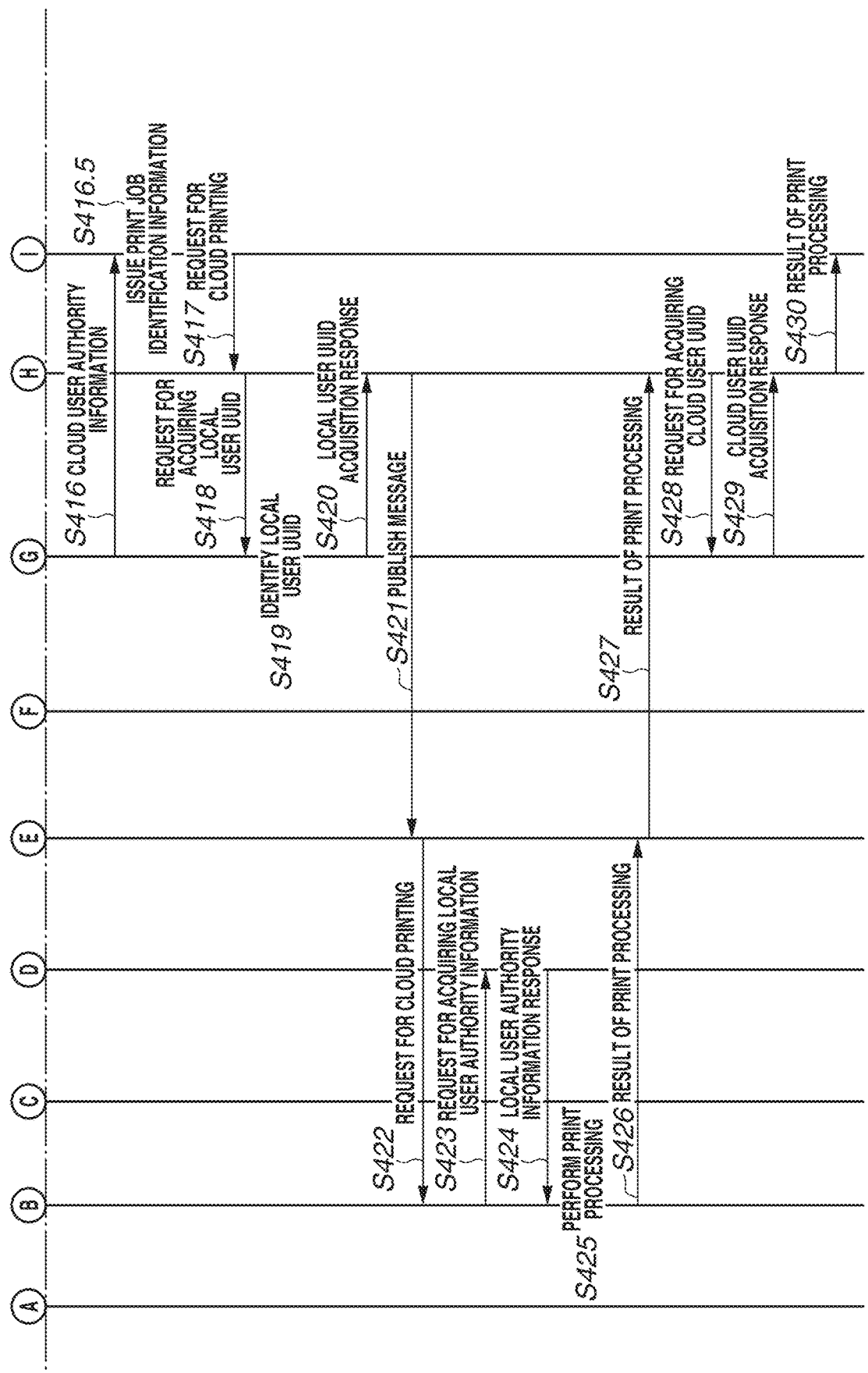

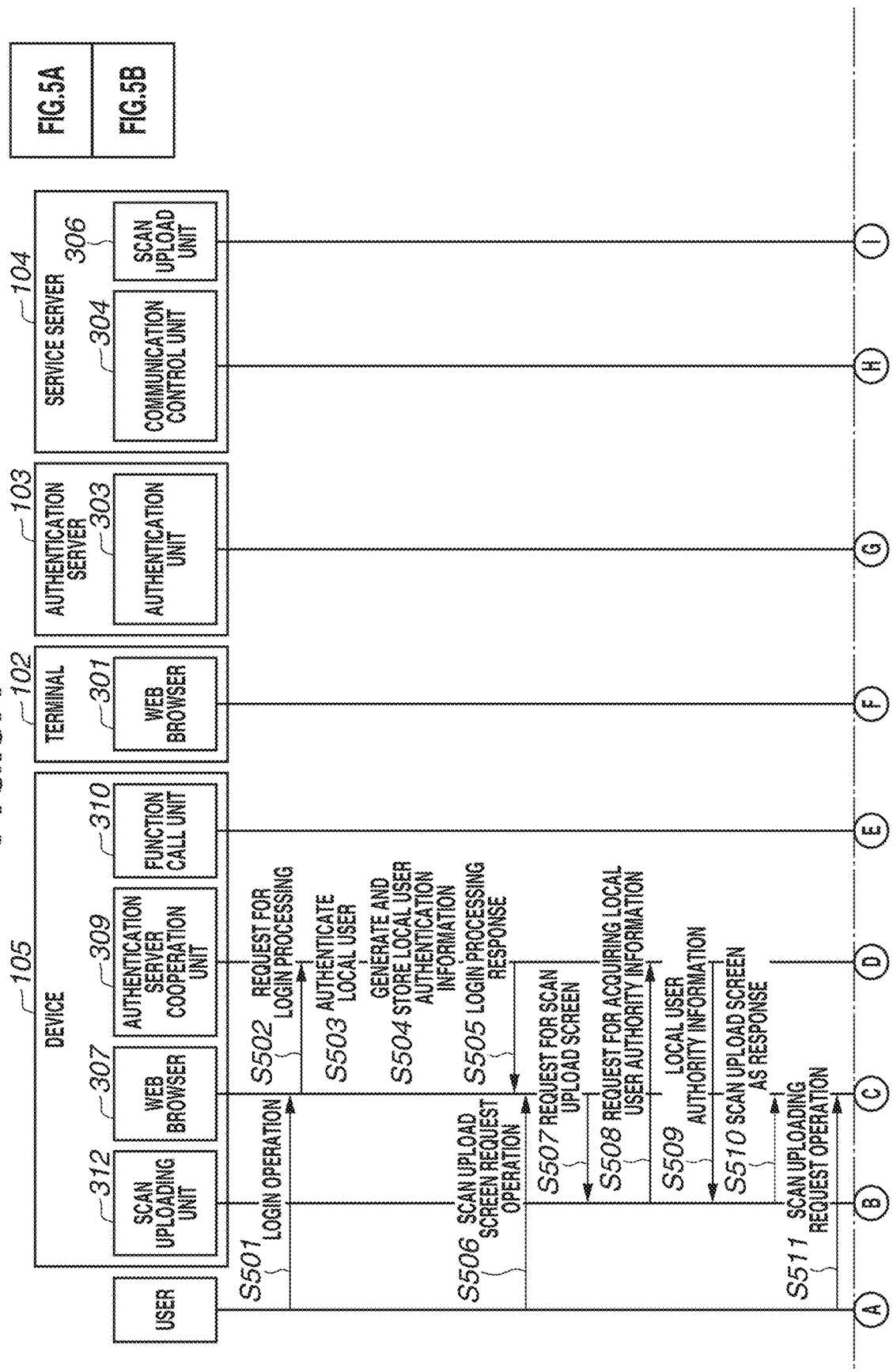

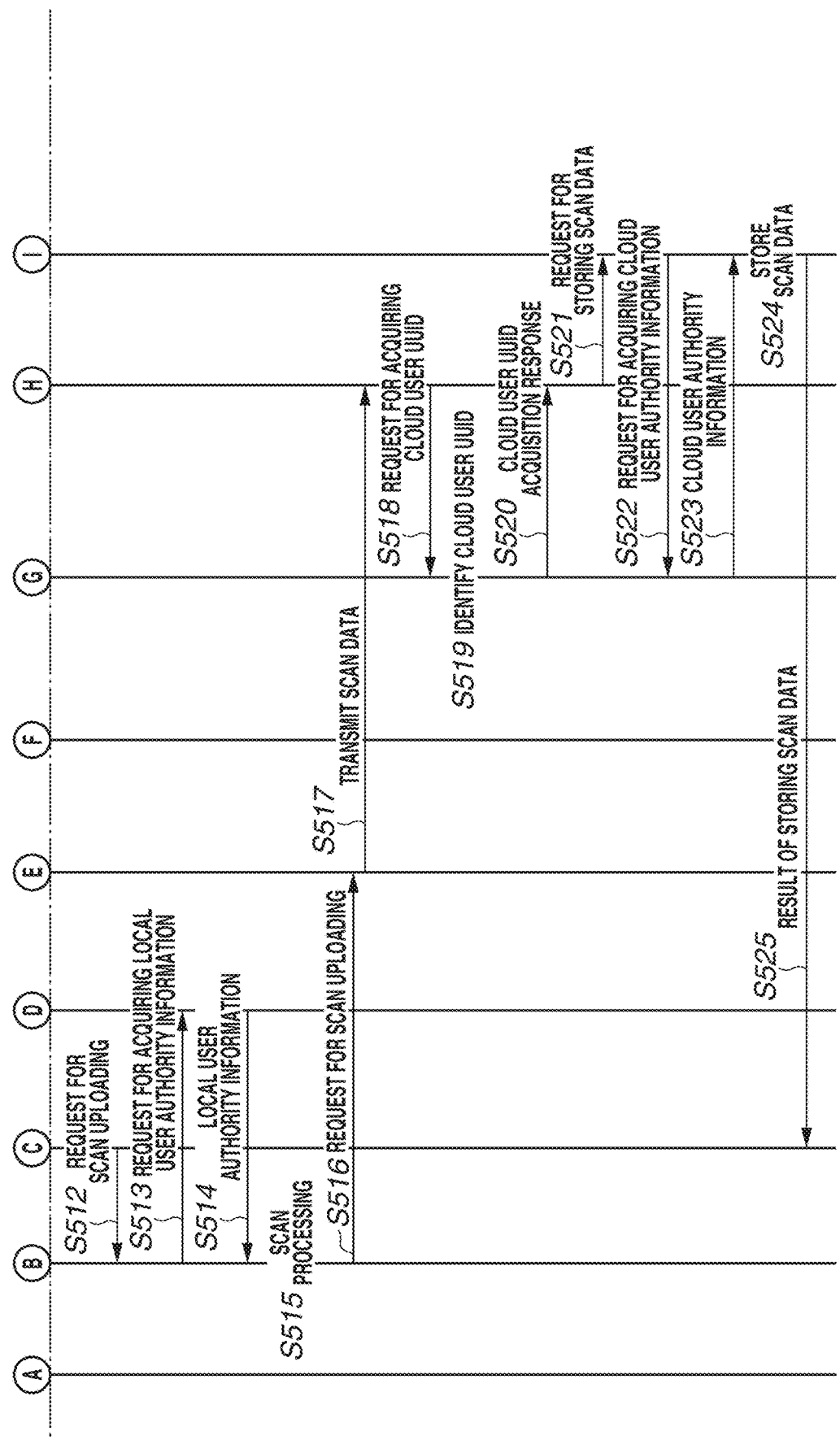

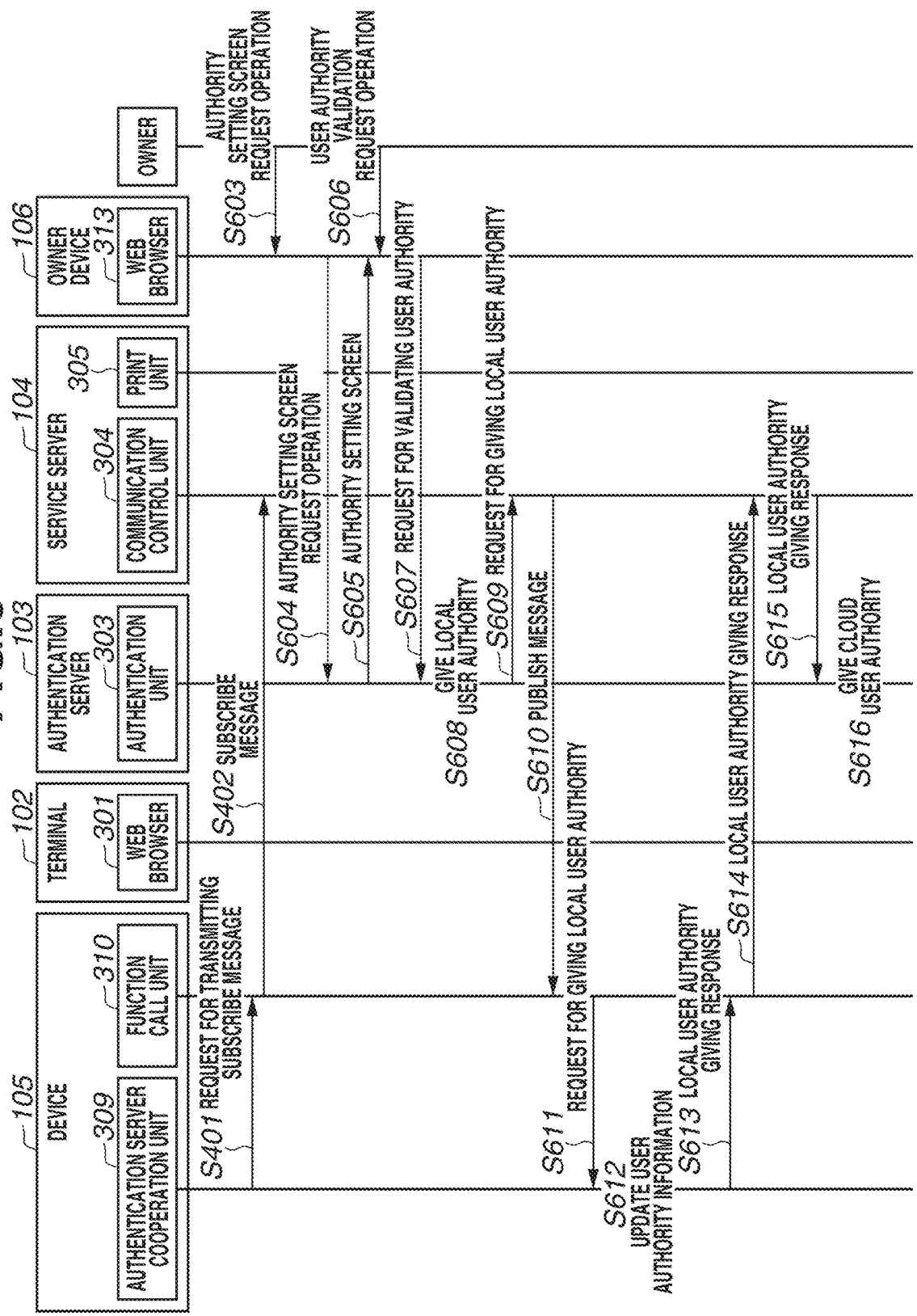

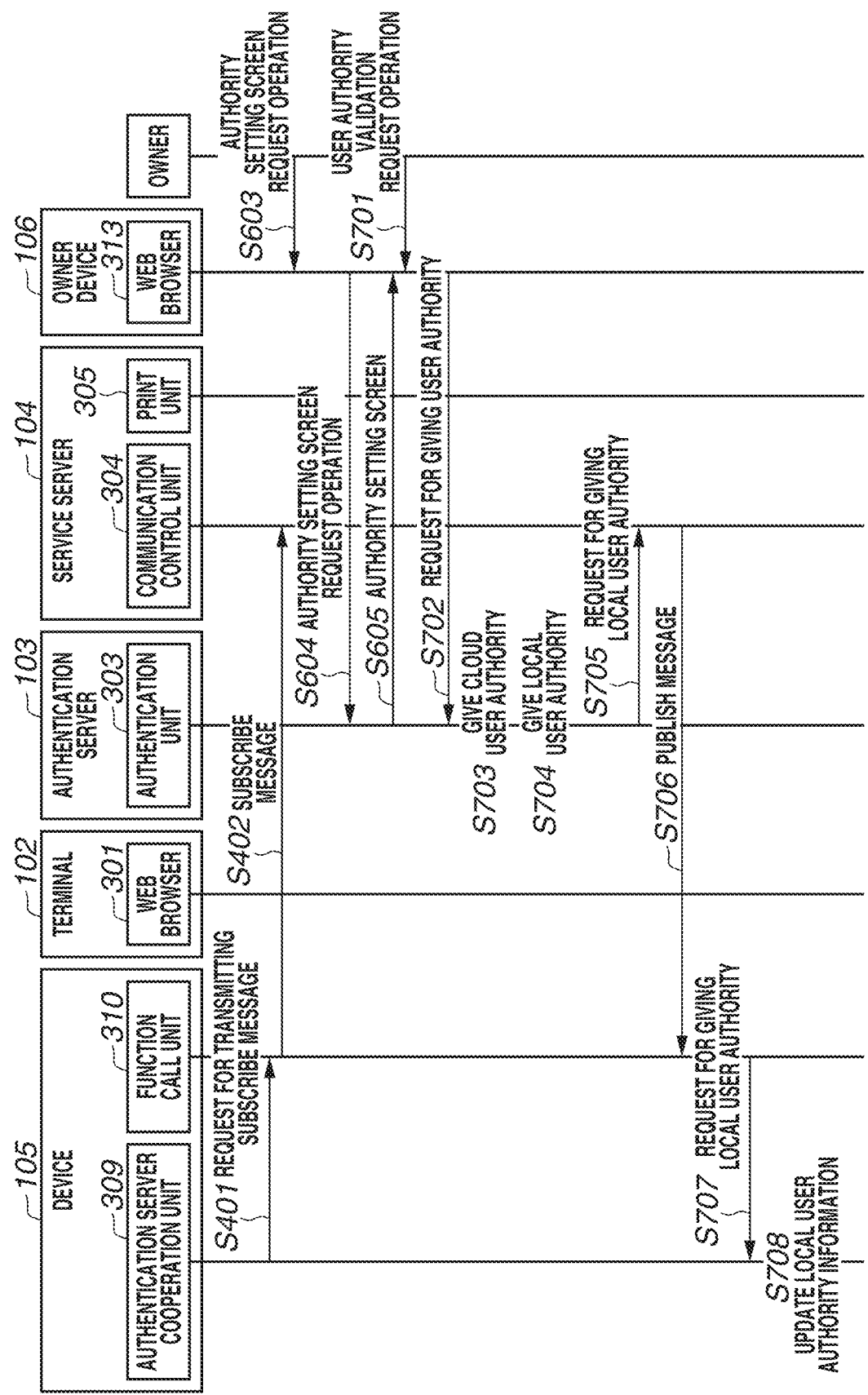

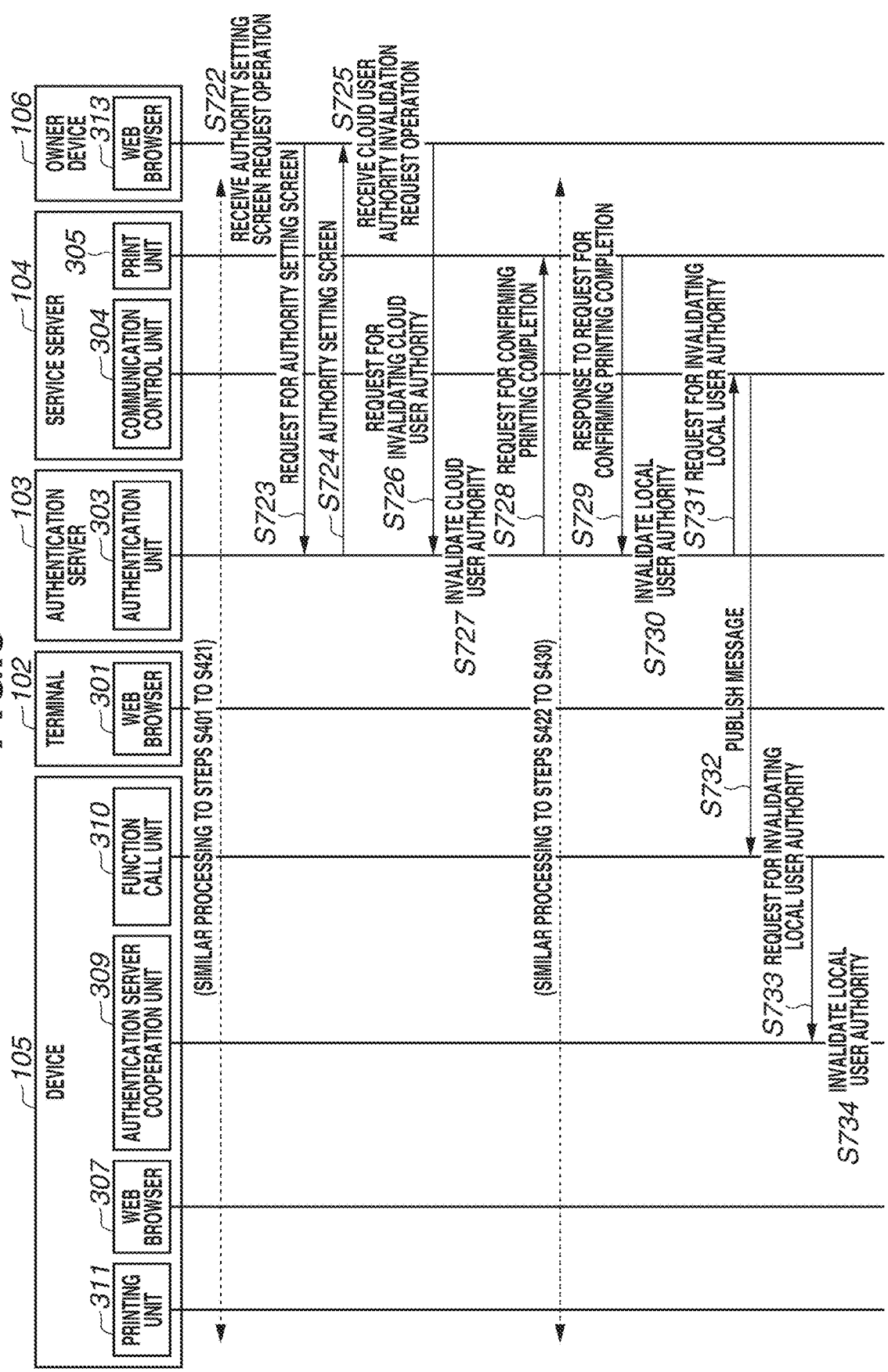

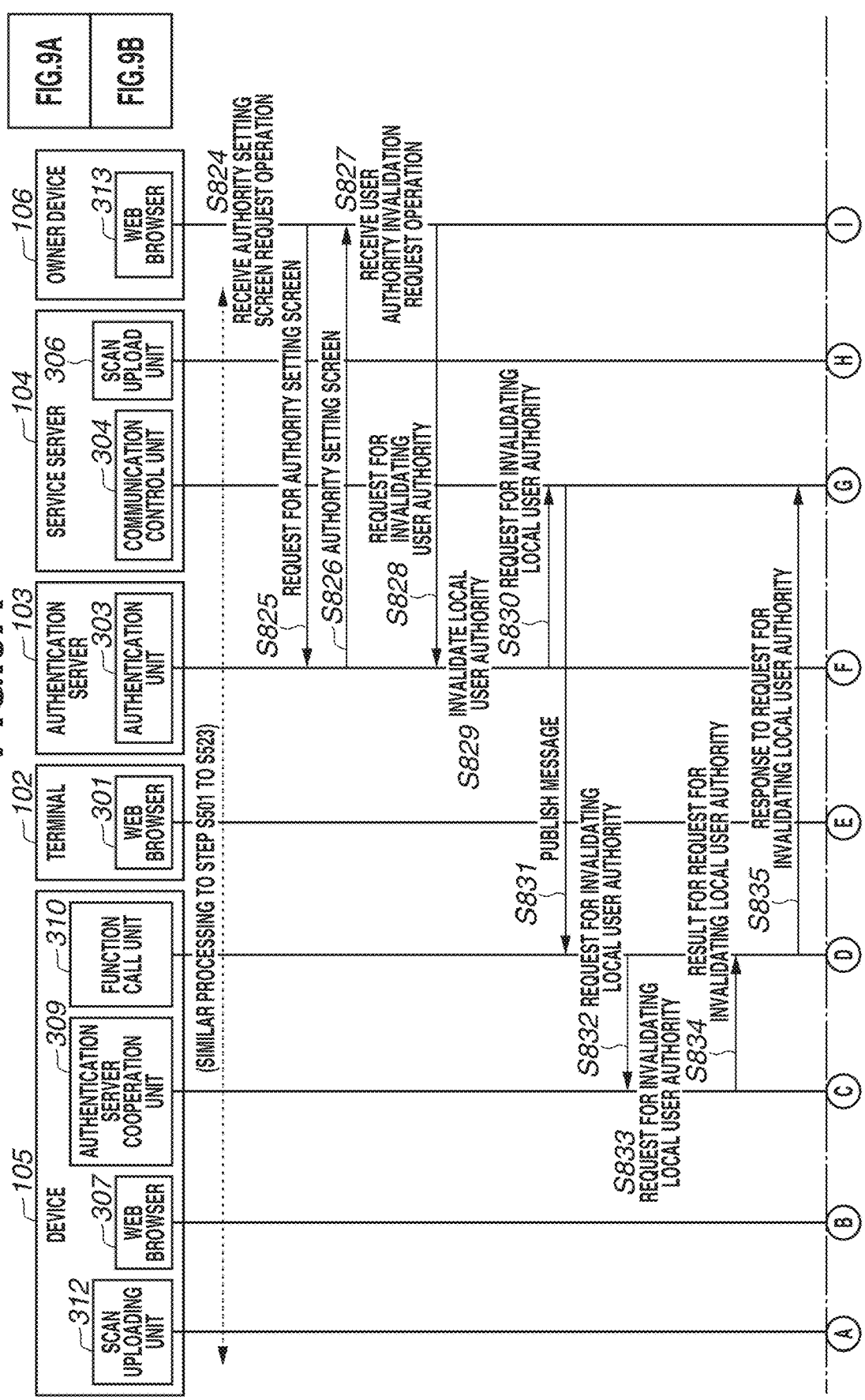

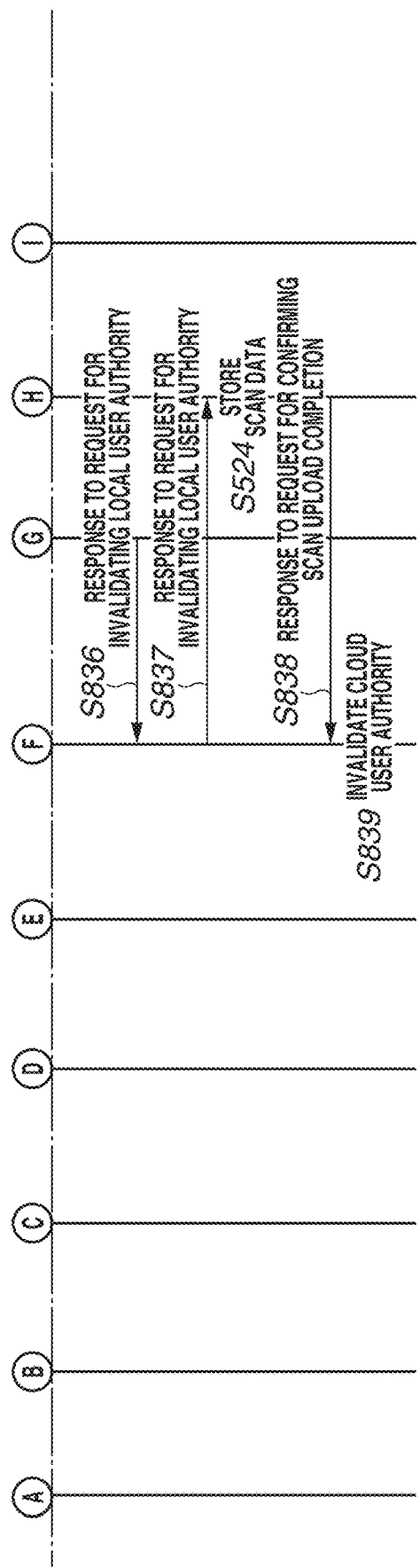

FIG.12

| BROWSER | | | ✕ |
|---|---|---|---|

RESTRICTION CONTROL SCREEN

| CLOUD USER ID | PRINT | SCAN UPLOAD |
|---|---|---|
| user00001 | ☐ | ☐ |
| user00002 | ✓ | ✓ |
| user00003 | ☐ | ✓ |

[ SET AUTHORITY ]

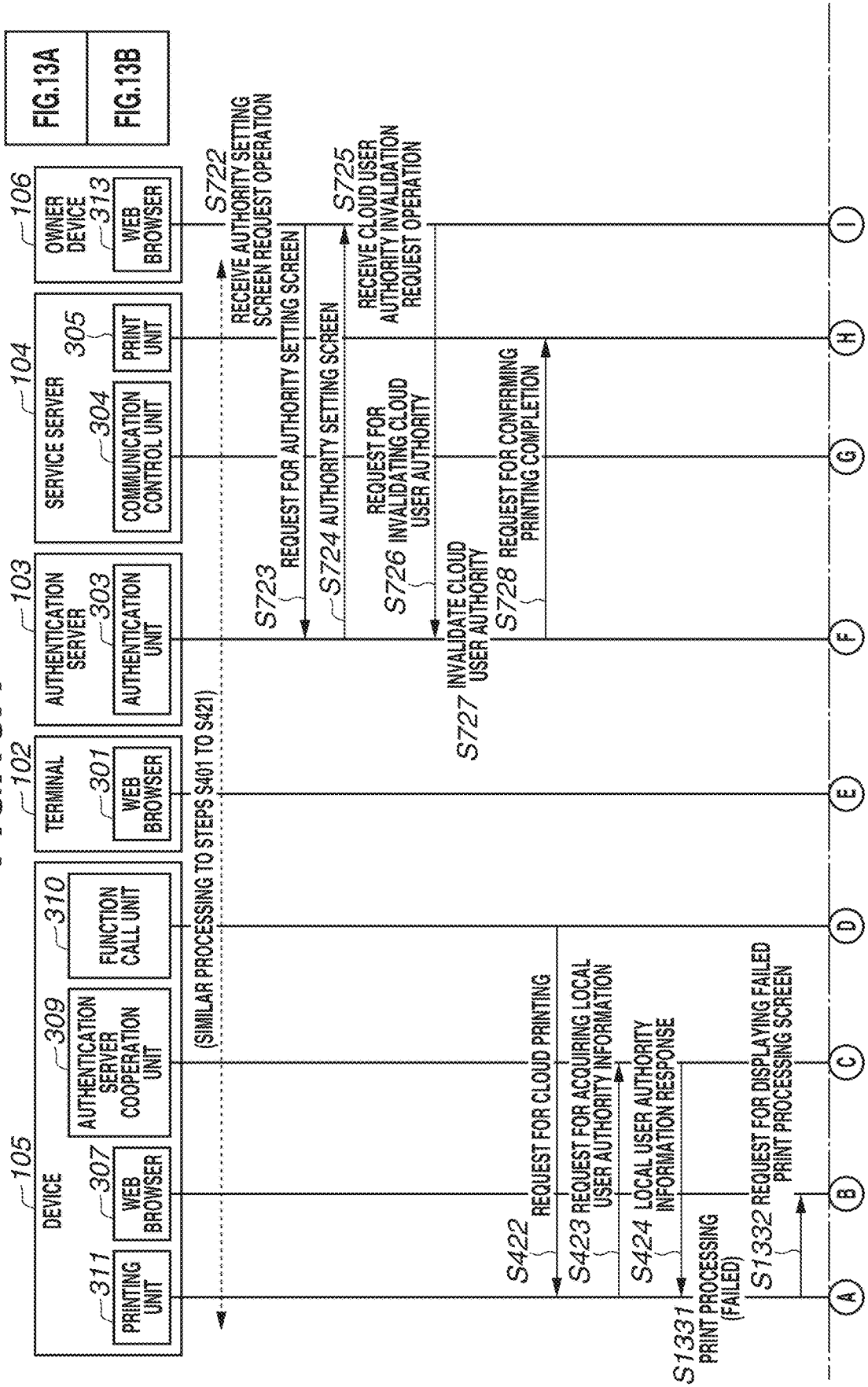

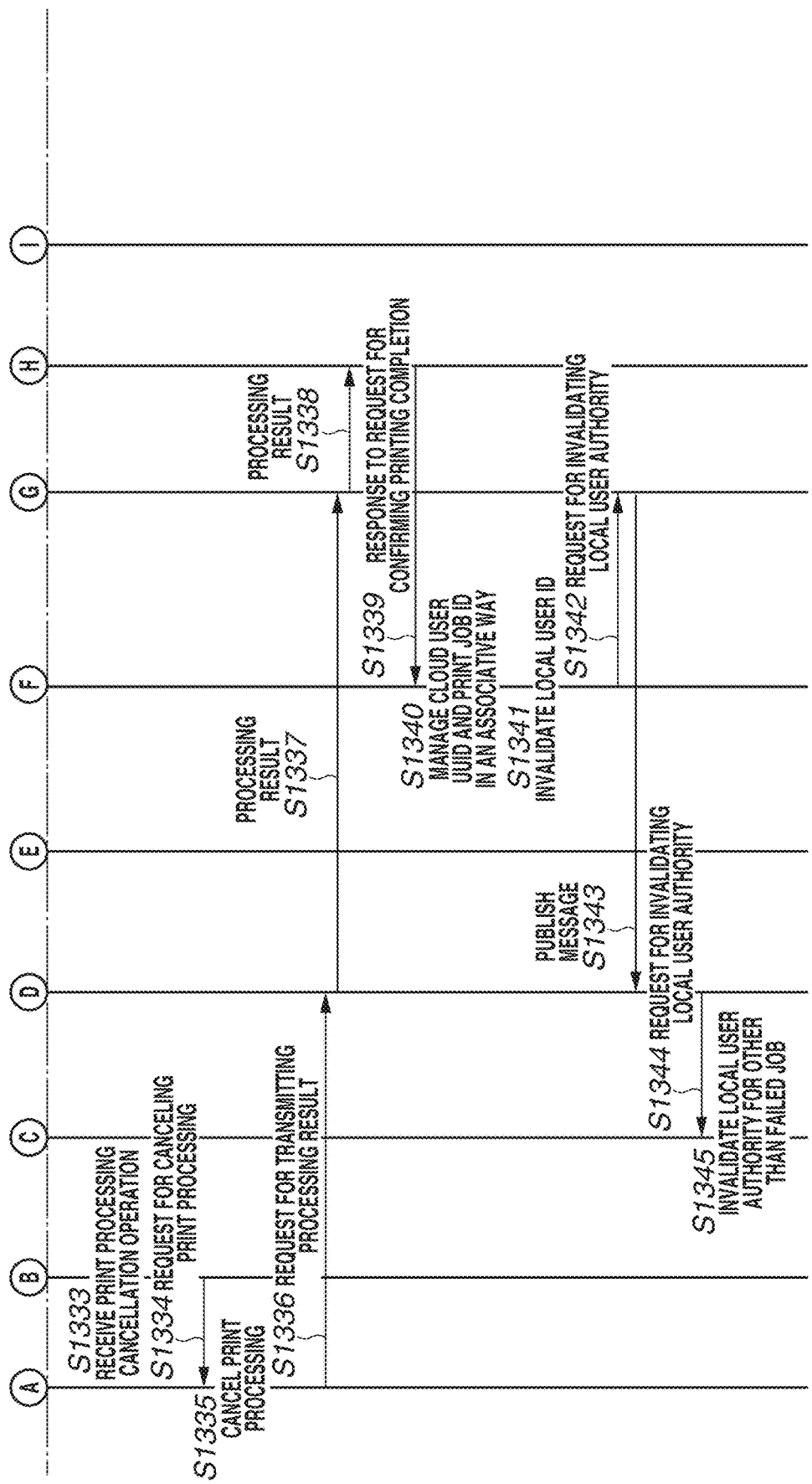

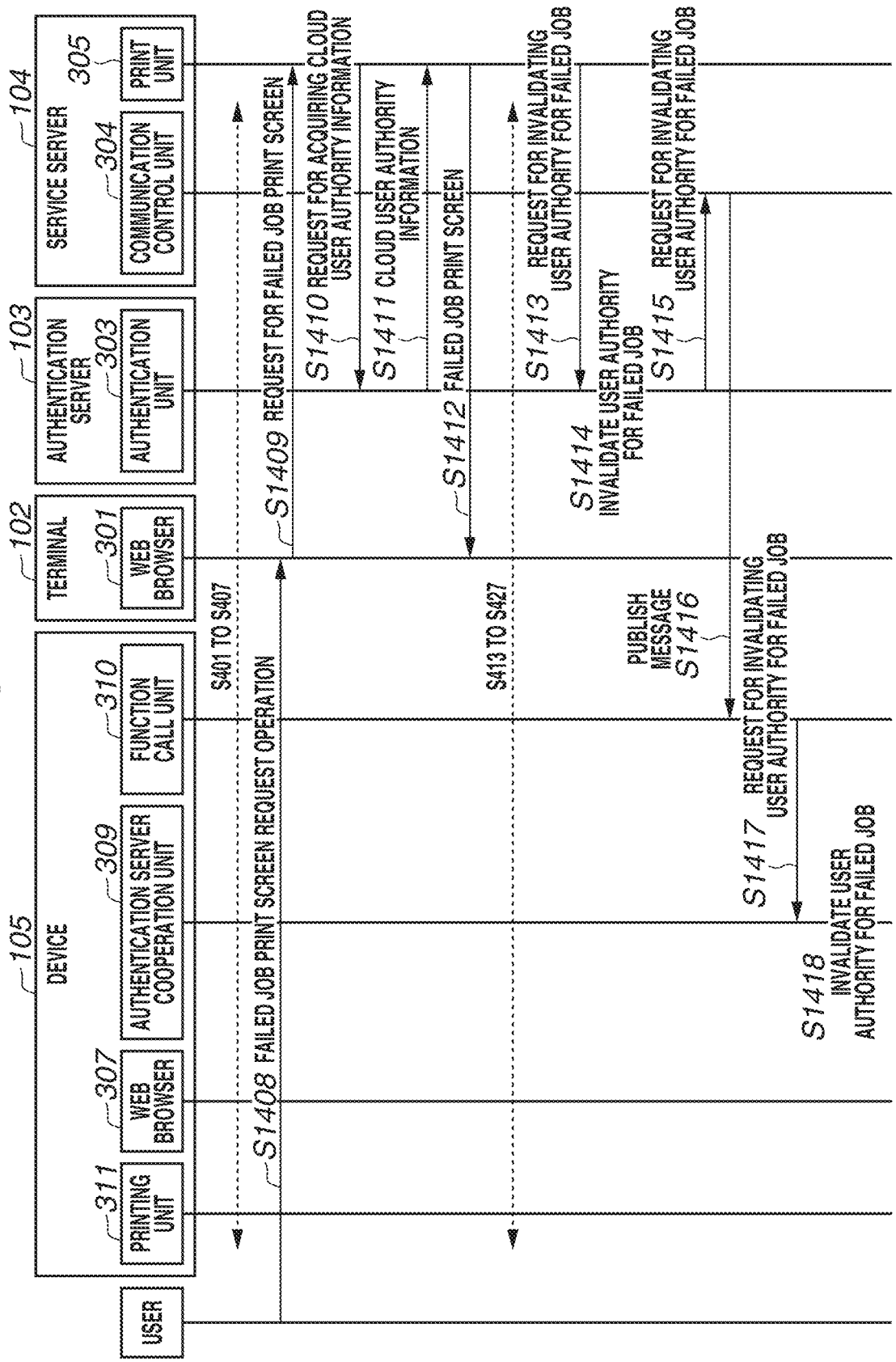

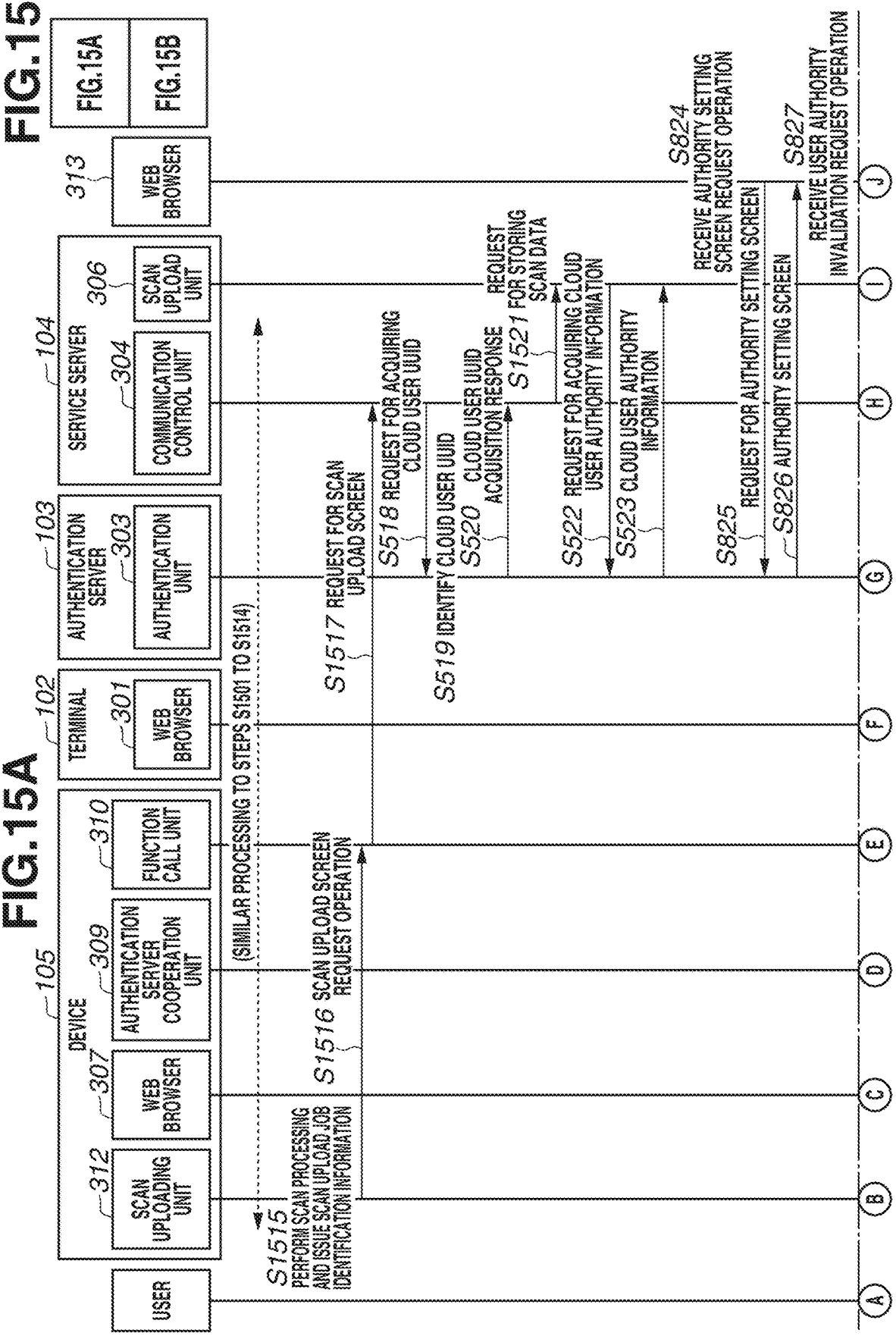

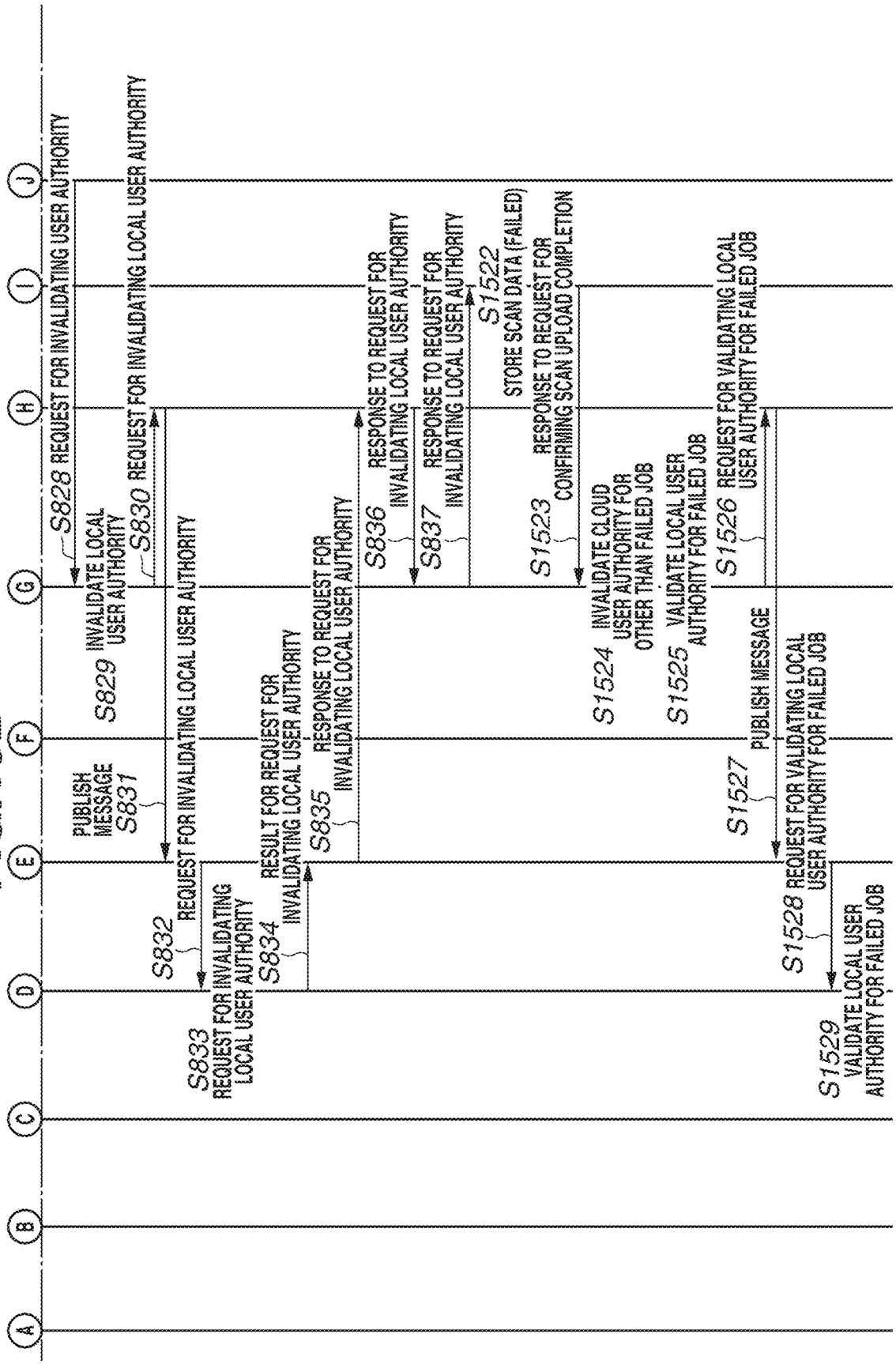

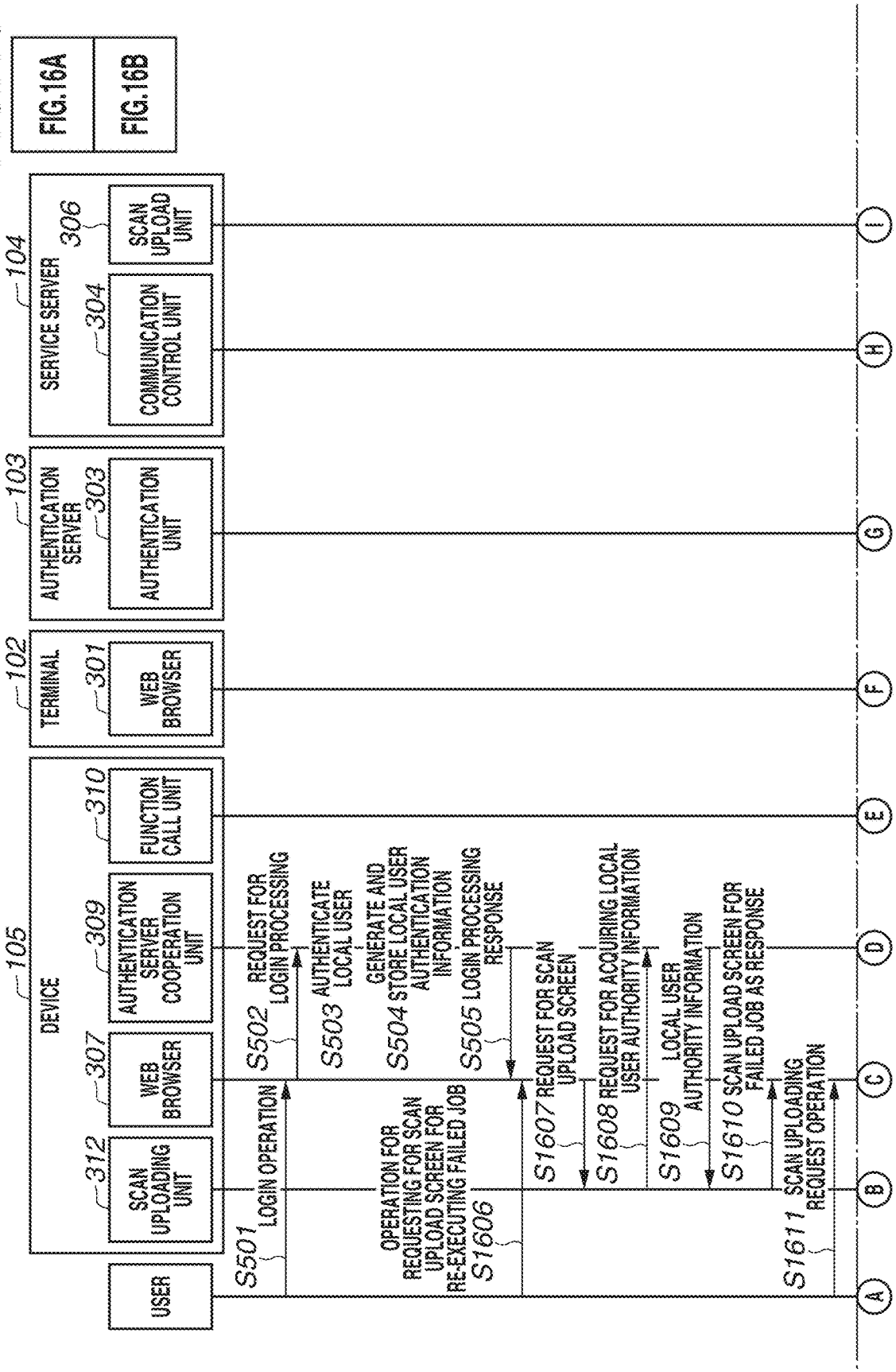

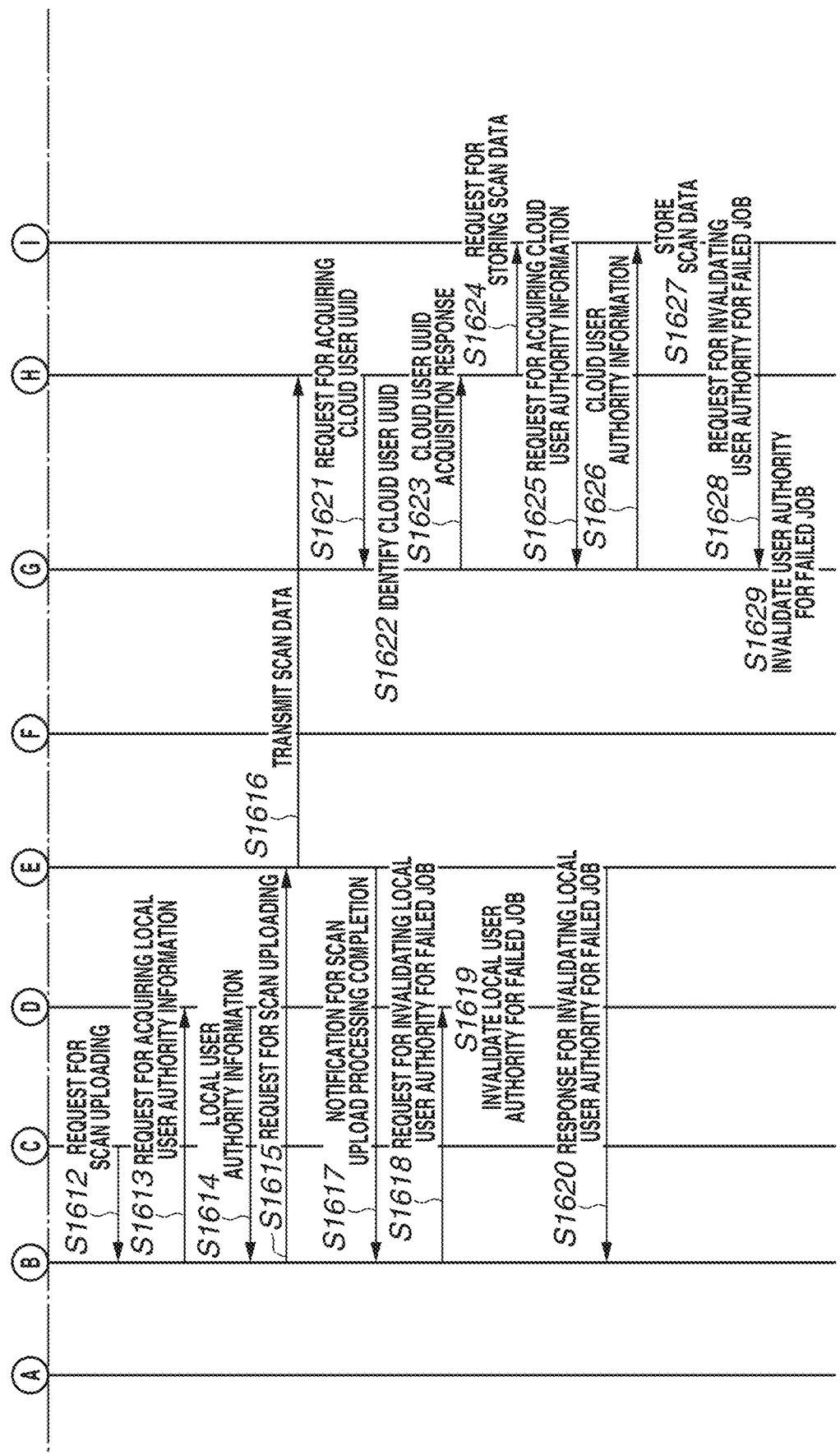

FIG.19

FAILED SCAN UPLOAD JOB SCREEN

DEVICE ID:   00001

| SELECTION | FAILED SCAN UPLOAD JOB UUID | DOCUMENT |
|---|---|---|
| ☐ | 90123456 | aaaaa.pdf |

UPLOAD

INFORMATION PROCESSING SYSTEM AND CONTROL METHOD

BACKGROUND

Field of the Disclosure

The present disclosure relates to an information processing system for managing a user authority and a control method.

Description of the Related Art

In recent years, there has been a service for exchanging data between a device and a cloud system by using functions of the device or functions offered by the cloud system.

Meanwhile, there is a configuration in which a user authority is provided to limit usable functions of a device on users of the device. Japanese Patent Application Laid-Open No. 2013-69244 discusses a computer system change system for giving and removing an authority to change settings to and from a user of a computer system according to the permission from an administrator of the computer system.

SUMMARY

According to an aspect of various embodiments, an information processing system, including a device and a service server, for managing a local user authority for a user to use functions of the device and a cloud user authority for the user to use functions of the service server, includes a first reception unit configured to enable the service server to receive a first request for performing first processing through a cooperation between the service server and the device by the user, a first execution unit configured to enable the service server to perform processing based on the first request when the validity of the cloud user authority is confirmed, a first invalidation unit configured to invalidate a cloud user authority to use a first function when a request for invalidating a cloud user authority to perform the first processing is received by the service server, a first confirmation unit configured to confirm that the processing based on the first request received by the first reception unit has been performed by the device, and a second invalidation unit configured to, in a case where the cloud user authority is invalidated, invalidate a local user authority to use the first function after the first confirmation unit confirms that the processing based on the first request has been performed.

According to an aspect of various embodiments, an information processing system, including a device and a service server, for managing a local user authority for a user to use functions of the device and a cloud user authority for the user to use functions of the service server, includes a second reception unit configured to enable the device to receive a second request for performing a second function through a cooperation between the service server and the device by the user, a second execution unit configured to enable the device to perform processing based on the second request when the validity of the local user authority is confirmed, a third invalidation unit configured to invalidate a local user authority to use the second function when the device receives a request for invalidating a local user authority to perform the second processing, a second confirmation unit configured to confirm that the processing based on the second request received by the second reception unit has been performed by the service server, and a fourth invalidation unit configured to, in a case where the local user authority is invalidated, invalidate a cloud user authority to use the second function after the second confirmation unit confirms that the processing based on the second request has been performed.

Further features of various embodiments will become apparent from the following description of exemplary embodiments with reference to the given drawings.

BRIEF DESCRIPTION OF THE DRAWINGS

FIG. 4 (consisting of FIGS. 4A and 4B) is a sequence diagram illustrating processing in which a terminal transmits a request to a service server.

FIG. 5 (consisting of FIGS. 5A and 5B) is a sequence diagram illustrating processing in which a device transmits a request to the service server.

FIG. 6 is a sequence diagram illustrating processing for validating a user authority to execute a cloud print request.

FIG. 7 is a sequence diagram illustrating processing for validating a user authority to execute a scan upload request.

FIG. 8 is a sequence diagram illustrating processing in which an owner invalidates a user authority to perform print processing.

FIG. 9 (consisting of FIGS. 9A and 9B) is a sequence diagram illustrating processing in which the owner invalidates a user authority to perform scan upload processing.

FIG. 12 illustrates an authority control screen on an owner device.

FIG. 13 (consisting of FIGS. 13A and 13B) is a sequence diagram illustrating processing in which an owner invalidates a user authority to perform print processing according to a second exemplary embodiment.

FIG. 14 is a sequence diagram illustrating processing for re-executing a failed print job by using another device according to the second exemplary embodiment.

FIG. 15 (consisting of FIGS. 15A and 15B) is a sequence diagram illustrating processing in which the owner invalidates a user authority to perform scan upload processing according to the second exemplary embodiment.

FIG. 16 (consisting of FIGS. 16A and 16B) is a sequence diagram illustrating processing for re-performing failed scan upload processing according to the second exemplary embodiment.

FIG. 19 illustrates an example of a failed scan upload screen.

DESCRIPTION OF THE EMBODIMENTS

When a device and a cloud system cooperate with each other, there may be a configuration in which a user authority is provided to limit usable functions of users of the cloud system. In this case, a request received before the user authority is invalidated may be interrupted or may not be executed depending on the timing of the request from the user.

More specifically, if the device is an image forming apparatus and a cloud print request has already been executed by the device, invalidating the user authority to perform a device function (print function, scan function, etc.), hereinafter referred to as a local user authority, may interrupt the request currently being executed. If the cloud system has received a print request but the device has not yet received the request, invalidating the local user authority makes the device unable to perform a request to be subsequently received.

Some embodiments manage the user authority when a device and a cloud system cooperate with each other so that, while preventing reception of a new request with an invalidated user authority, a request received before invalidating the user authority can be executed.

Some embodiments make it possible to manage the user authority when a device and a cloud system cooperate with each other so that, while preventing reception of a new request by an invalidated user authority, a request received before invalidating the user authority can be executed.

Exemplary embodiments will be described below.

Figure 1:
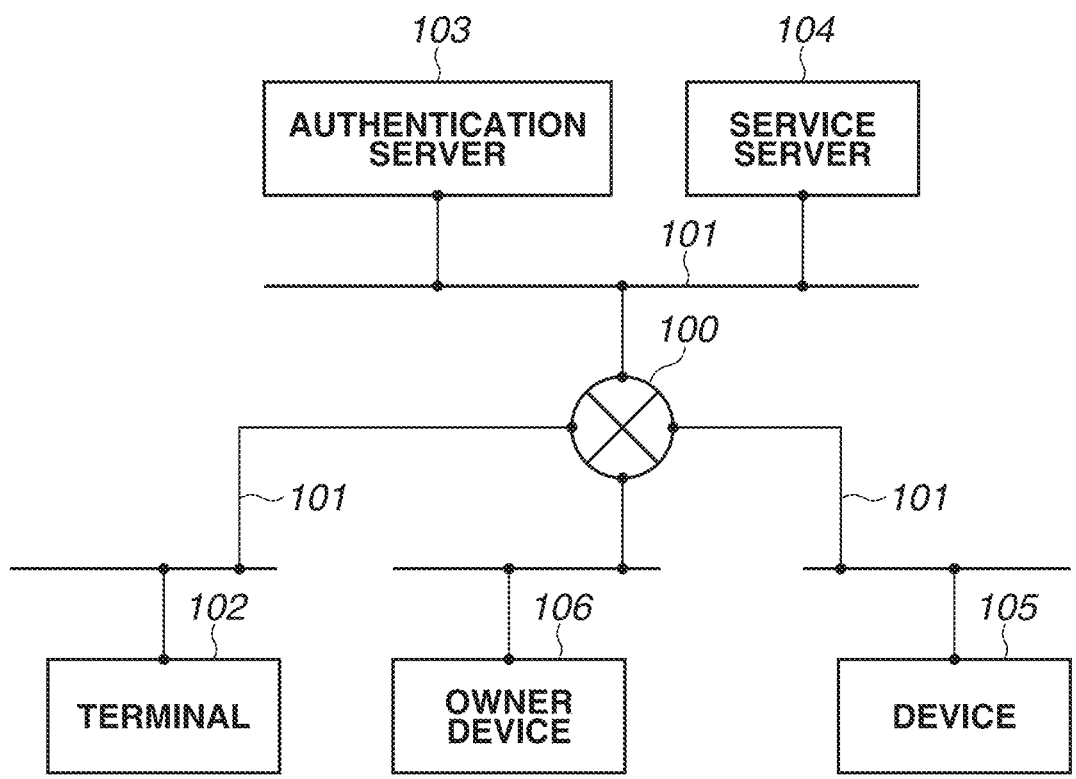
FIG. 1 is an example of a block diagram illustrating a configuration of an information processing system according to an exemplary embodiment.

Various apparatuses constituting an information processing system according to a first exemplary embodiment will be described below with reference to FIG. 1. FIG. 1 illustrates a state where a terminal 102, an authentication server 103, a service server 104, a device 105, and an owner device 106 are connected via a wide area network (WAN) 100 (the apparatuses 103 to 106 constitute an information processing system). The WAN 100 is connected with various apparatuses via a local area network (LAN) 101.

The terminal 102 (e.g., personal computer (PC), smart phone, and tablet PC) transmits a request to the device 105 when a user operates the terminal 102. However, the operation mode of the device 105 is not limited thereto. The user may directly operate the device 105. The authentication server 103 authenticates a user, such as a cloud user and a local user, and the device 105, such as a multifunction peripheral (MFP), and the authentication server 103 registers relevant authentication information.

The service server 104 is capable of communicating with the terminal 102 and the device 105 via the WAN 100. The service server 104 is, for example, a server for performing message communication based on Message Queuing Telemetry Transport (MQTT) Broker. MQTT is a message communication protocol of a publish/subscribe model. The publish/subscribe model distributes messages from a message sender (hereinafter referred to as a publisher) to a message receiver (hereinafter referred to as a subscriber) via MQTT Broker as a message intermediary. The subscriber specifies the subscriber itself as a message destination (hereinafter referred to as a topic), transmits a message to the service server 104, and makes a reservation so that the subscriber is able to receive a message which coincides with the topic from the service server 104 (hereinafter making a reservation is referred to as subscribing). A message transmitted from the subscriber to the service server 104 to subscribe is called a subscribe message.

The publisher transmits a message with a topic specification to the service server 104. The service server 104 distributes a message to the subscriber which subscribes the same topic as the topic (hereinafter distributing a message is referred to as publishing a message). A message with a topic specification transmitted to the service server 104 for publishing by the publisher and a message transmitted to the subscriber by the publisher are collectively called publish messages.

A topic has a hierarchical structure delimited by slashes "/" (e.g., /A/BC/D/E). The subscriber is able to receive a message of a topic satisfying a specified condition when the subscriber specifies full match or partial match of the topic. MQTT Broker checks match or mismatch between the topic of a received publish message and the topic of a subscribe message and, when matched, transmits the publish message to the subscriber. Even if communication from the service server 104 to the device 105 is interrupted by a firewall, the use of MQTT enables communication with the device 105.

Exemplary embodiments will be described below on the premise that the service server 104 has functions of an MQTT Broker. However, as long as the device 105 can acquire a request from the service server 104, a configuration using other protocols is also applicable. For example, in a possible configuration, the device 105 periodically transmits a request for acquiring information to the service server 104 and receives a request as a response from the service server 104.

The service server 104 provides the terminal 102 with cloud services. Cloud services refer to functions or a group of functions offered by a web application executed on the service server 104. More specifically, these functions include a function of transmitting a request received from the terminal 102 to the device 105, a function of storing data uploaded from the device 105, and a function of transmitting data to a server different from the service server 104.

The device 105 is an information processing apparatus, such as an image forming apparatus, PC, and smart phone, and is a multi-user device for managing local user information of a plurality of local users. The device 105 transmits a subscribe message with a topic specification to the service server 104 as an MQTT Broker to enable receiving a publish message of which the destination coincides with the topic.

The owner device 106 is an apparatus, such as a PC, smart phone, and tablet PC. The owner gives and removes a user authority to and from the authentication server 103 by using the owner device 106.

Figure 2:
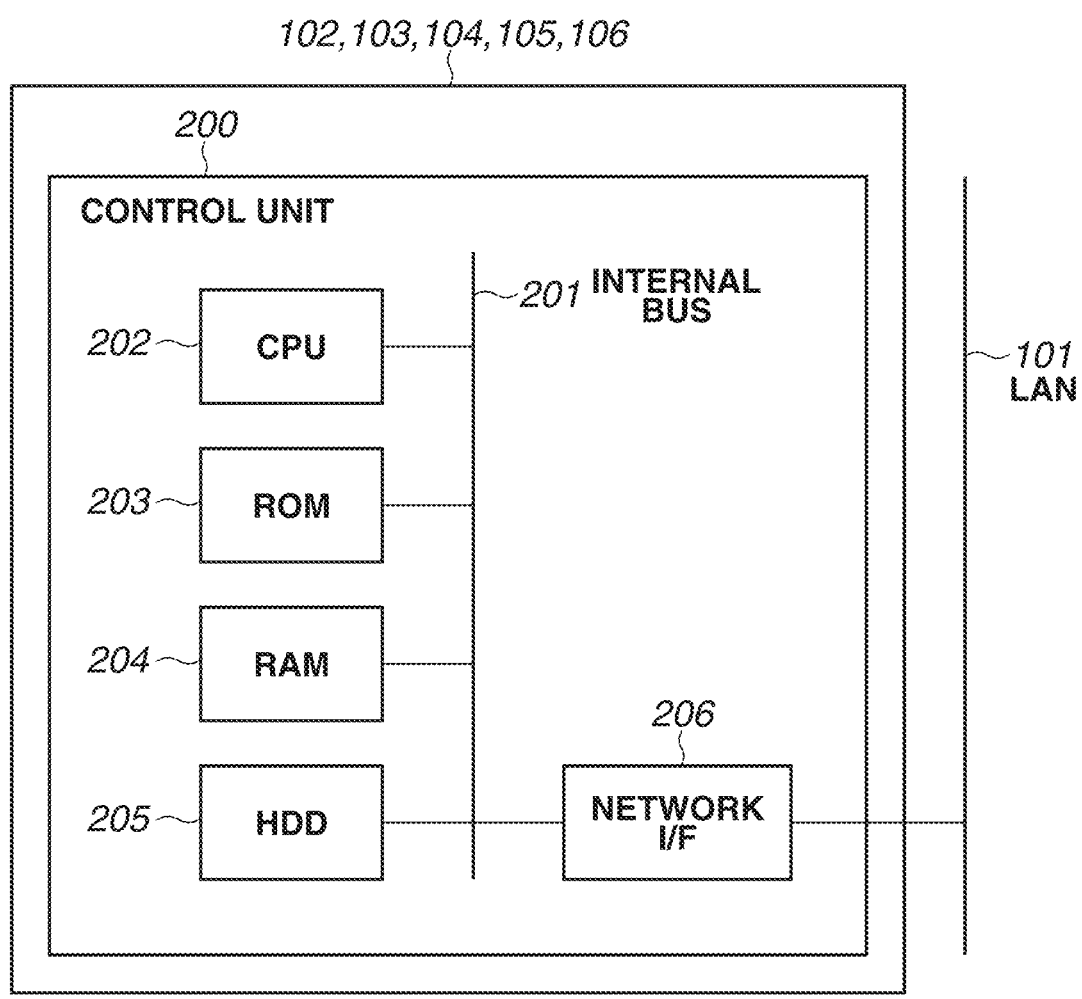
FIG. 2 is a block diagram illustrating a hardware configuration of various apparatuses constituting the information processing system.

Hardware configurations of the apparatuses 102 to 106 illustrated in FIG. 1 will be described below with reference to FIG. 2. The hardware block diagram illustrated in FIG. 2 is equivalent to a hardware block diagram of an information processing apparatus, such as a PC, and is applicable to the hardware configurations of the apparatuses 102 to 106 according to the first exemplary embodiment. The hardware configuration illustrated in FIG. 2 will be described below using the terminal 102 as an example.

A control unit 200 is connected to the LAN 101 via a network interface (I/F) 206. In the control unit 200, a central processing unit (CPU) 202, a read only memory (ROM) 203, a random access memory (RAM) 204, and a hard disk drive (HDD) 205 are connected with each other via an internal bus 201. The CPU 202 executes a boot program in the ROM 203 to load an operating system (OS) and a control program stored in the HDD 205 into the RAM 204 and controls the terminal 102 based on the program.

The ROM 203 is a storage device for storing the boot program and various data for the information processing apparatus 200. The RAM 204 is a work memory used by the CPU 202 to execute instructions. A program stored in the ROM 203 is loaded into the RAM 204, and the CPU 202 sequentially reads and executes instructions of the program. The HDD 205 is a storage device for storing the OS and various programs. The network I/F 206 is connected with the CPU 202, the ROM 203, the RAM 204, and the HDD 205 via the internal bus 201 and inputs and outputs information to and from the terminal 102 via a network, such as the LAN 101. In all of descriptions below, unless otherwise noted, the CPU 202 is the main component of hardware operations of various apparatuses, and each application program installed in the HDD 205 is the main component of software operations of these apparatuses.

Figure 3:
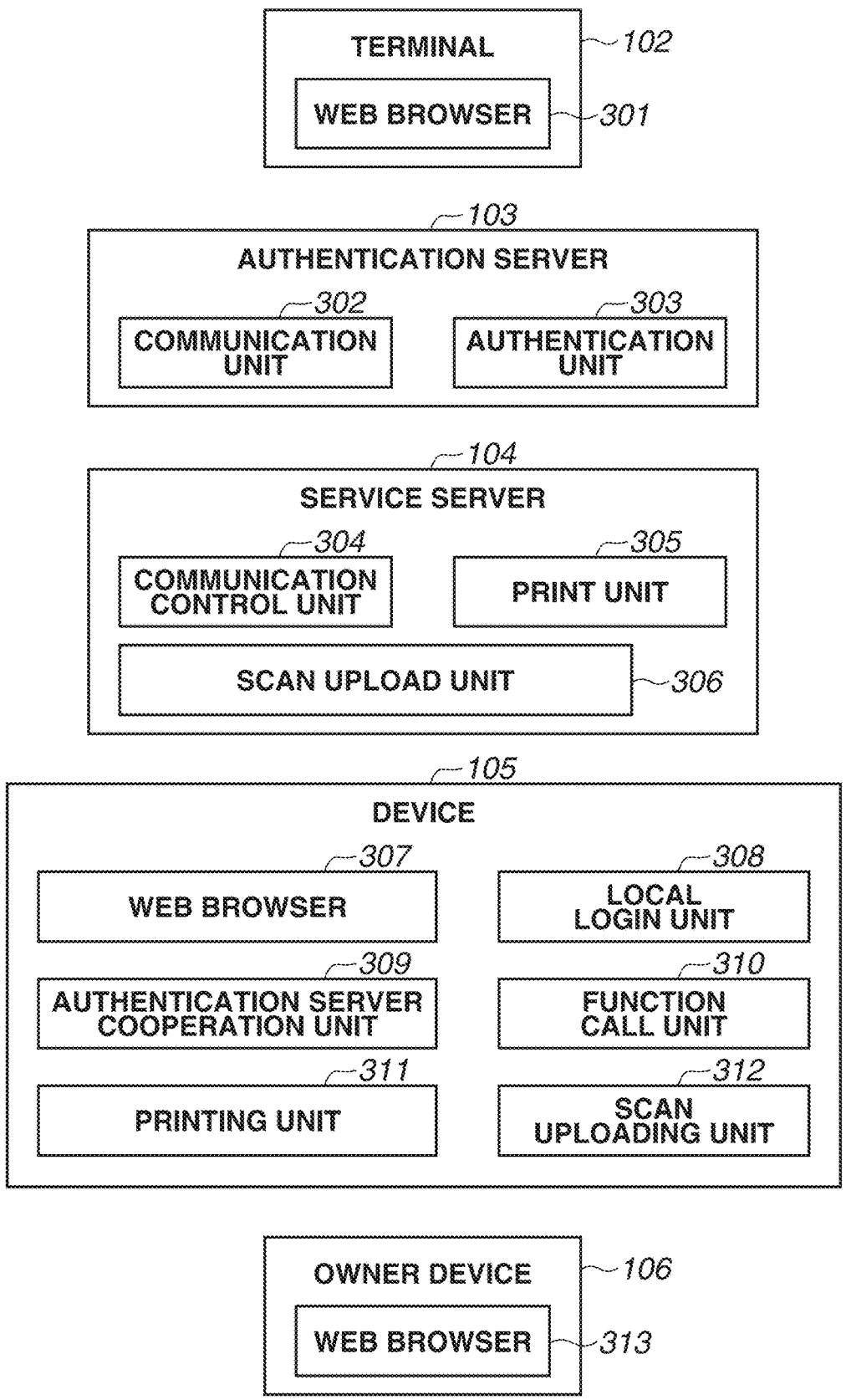
FIG. 3 is a block diagram illustrating functions of various apparatuses.

Functions of the terminal 102, the authentication server 103, the service server 104, the device 105, and the owner device 106 will be described below with reference to FIG. 3. Each function is implemented when the CPU 202 of various apparatuses executes an application program that has loaded in the RAM 204.

The terminal 102 includes a web browser 301 and communicates with the authentication server 103 and the service server 104 by using the web browser 301.

The authentication server 103 includes a communication unit 302 and an authentication unit 303. The authentication unit 303 communicates with an external apparatus via the communication unit 302. The authentication unit 303 performs a function of authenticating a user (cloud user and local user) and the device 105, such as an MFP, and a function of managing relevant authentication information.

The service server 104 includes a communication control unit 304, a print unit 305, and a scan upload unit 306. The communication control unit 304 receives a subscribe message and distributes a publish message. The print unit 305 performs a function of receiving a request for printing from the terminal 102 and transmitting a request to the device 105 via the communication control unit 304. The scan upload unit 306 is a function of storing scan data received from the device 105 in the service server 104. If the storing location of the data is other than the service server 104, scan data may be stored in other servers via the scan upload unit 306.

The device 105 includes a web browser 307, a local login unit 308, an authentication server cooperation unit 309, a function call unit 310, a printing unit 311, and a scan uploading unit 312. The web browser 307 is a user agent for using a world wide web (WWW). The local login unit 308 performs a function of authenticating a local user. In a possible configuration of a local user authentication method, the local login unit 308 communicates with an authentication server (not illustrated) to authenticate a local user. The authentication server cooperation unit 309 performs a function of transmitting a request for issuing authentication cooperation information.

The authentication cooperation information associates cloud user authentication information (information for uniquely identifying a cloud user) with local user authentication information (information for uniquely identifying a local user). A path code is an example of authentication cooperation information. The cloud user authentication information, which is a collective term of authentication information generated when a cloud user logs into the authentication server 103, includes information for uniquely identifying a cloud user, such as a cloud user identifier (ID) and a cloud user Universally Unique Identifier (UUID). The UUID, which is an identifier for uniquely identifying a user, is generated not to overlap with other users unlike the ID. More specifically, using the cloud user UUID makes it possible to identify all of user information set for each tenant in a multi-tenant system.

On the other hand, the local user authentication information, which is a collective term of authentication information generated when a local user logs into the device 105, includes information for uniquely identifying a local user, such as a local user ID and a local user UUID. Association information for associating the cloud user UUID with the local user UUID by using authentication cooperation information will be described below.

Herein, a configuration in which the cloud user authentication information and the local user authentication information are associated with each other will be described below. A validity period may be preset in the authentication cooperation information, or the authentication cooperation information may be deleted at the timing when a cloud user or a local user logs out. It is also possible to generate association information in advance by using user information (see Tables 1 and 5 (described below)) included in the authentication unit 303 and the authentication server cooperation unit 309 and not to provide a limit of term for the association information. More specifically, any configuration is possible as long as the device 105 and the authentication server 103 have a corresponding table for associating the cloud user authentication information with the local user authentication information.

The function call unit 310 as a component of the device 105 performs a function of transmitting a subscribe message to the service server 104 and waiting for a processing request from the service server 104 in the user association processing for associating the cloud user UUID with the local user UUID.

The printing unit 311 performs a function of instructing a print unit of the device 105 to perform print processing. The scan uploading unit 312 performs a function of instructing a scan unit of the device 105 to execute scan processing and also a function of uploading scan data acquired in the scan processing to the service server 104. The owner device 106 includes a web browser 313 and communicates with the service server 104 through the web browser 313.

Processing for transmitting a request from the terminal 102 to the service server 104 will be described below with reference to FIG. 4 (consisting of FIGS. 4A and 4B). The present exemplary embodiment will be described below on the premise that a request transmitted from the terminal 102 to the service server 104 is a request for executing the print function of the device 105.

In S401, in order for the device 105 to receive a print request, the authentication server cooperation unit 309 requests the function call unit 310 to transmit a subscribe message to the communication control unit 304. In S402, the function call unit 310 transmits a subscribe message to the communication control unit 304. The topic of a subscribe message is specified by using device identification information of the device 105. More specifically, a topic has a hierarchical structure delimited by a slash "/" (e.g., /A/BC/D/E), allowing the subscriber as the function call unit 310 to define the classification of information to be received. Therefore, the subscriber specifies a message transmission destination with, for example, "(Location where the device 105 is installed)/(Device identification information)". Accordingly, the function call unit 310 can receive a publish message with a topic specified by the device identification information of the device 105. To maintain communication with the communication control unit 304, the function call unit 310 transmits a subscribe message to the communication control unit 304 each time the disconnection of communication is detected.

In S403, the web browser 301 receives a login operation from the user. In S404, the web browser 301 transmits a request for login processing to the authentication unit 303. The authentication unit 303 in the authentication server 103 performs the login processing based on a predetermined authentication method. Examples of authentication methods include a method for verifying the combination of a user ID and a password, a method for verifying living body information, such as fingerprint, a method for using a noncontact integrated circuit (IC) card, and a multi-factor authentication method that combines a plurality of authentication methods. The present exemplary embodiment will be described below based on a method for verifying the combination of a user ID and a password. Table 1 illustrates an example of cloud user information included in the authentication unit 303. In S405, referring to Table 1, the authentication unit 303 performs cloud user authentication based on the combination of a cloud user ID and a password.

TABLE 1

| Cloud user ID | Cloud user UUID | Password |
| --- | --- | --- |
| se001 | CCC1 | se001 |
| se002 | CCC2 | se002 |

In S406, the authentication unit 303 generates and stores the cloud user authentication information of the authenticated user. This cloud user authentication information is stored in an effective state until the user performs a logout operation (not illustrated) or a set time comes. The cloud user authentication information includes the cloud user ID and cloud user UUID of the authenticated user. In other words, the cloud user authentication information includes almost the same information as the cloud user information illustrated in Table 1. According to the present exemplary embodiment, it is assumed that the user having the cloud user ID "se001" logs in, and the cloud user authentication information (the cloud user ID "se001", the cloud user UUID "CCC1", and the password "se001") is generated in S406.

The authentication unit 303 is not limited to a configuration for directly storing the cloud user authentication information. The authentication unit 303 may store a token associated with the cloud user authentication information and, referring to the token, use the cloud user authentication information stored in a location different from the authentication unit 303.

In S407, the authentication unit 303 transmits a login processing response to the web browser 301. In this processing, a session ID associated with the cloud user UUID generated in S406 is transmitted to the web browser 301. The session ID is an identifier for identifying the user who has logged in. According to the present exemplary embodiment, the session ID is managed by the authentication unit 303 in association with the cloud user UUID generated in S406. When the web browser 301 receives the session ID in S407, the session ID is managed by Cookie (not illustrated) of the web browser 301. According to the exemplary embodiments to be described below, unless otherwise noted, this session ID is transmitted and received in communication between the web browser 301 and the authentication unit 303.

In S408, the web browser 301 receives a print screen request operation for cloud printing from the user. In S409, the web browser 301 transmits a request for the print screen to the print unit 305. In S410, the print unit 305 transmits a request for acquiring the cloud user authority information for performing the print processing to the authentication unit 303. In this processing, the session ID acquired from the web browser 301 is transmitted together with the request for acquiring the cloud user authority information. Thus, in S411 (described below), the authentication unit 303 can identify the user who has logged in the authentication server 103 based on the session ID and identify the cloud user authority information of the identified user.

In S411, the authentication unit 303 transmits the cloud user authority information for performing the print processing to the print unit 305. More specifically, the authentication unit 303 transmits the cloud user authority information to the print unit 305 based on an authority table included in the authentication unit 303. Table 2A illustrates an example of the authority table. The authority table illustrated in Table 2A manages "User authority to perform print processing", "User authority to perform scan upload processing", and "Session ID" for each cloud user UUID. Referring to Table 2A, "1" indicates the state where the user authority is given, and "0" indicates the state where the user authority is invalidated. The authority table manages the presence or absence of the user authority with setting values. This also applies to the following authority tables. The above-described method for managing the user authority with setting values is to be considered as an example. According to the present exemplary embodiment, invalidating the user authority includes an operation for removing the user authority (by using setting values), an operation for disabling the user authority, and an operation for deleting the record related to the user authority.

Referring to Table 2A, when the session ID received at this time in S410 is assumed to be "1234aaaa", the authentication unit 303 identifies that the user who has logged in the authentication server 103 has the cloud user ID "se001" (cloud user UUID "CCC1") and that the cloud user authority to perform the print processing is given to the user.

TABLE 2A

| Cloud user UUID | User authority to perform print processing | User authority to perform scan upload processing | Session ID |
| --- | --- | --- | --- |
| CCC1 | 1 | 1 | 1234aaaa |
| CCC2 | 0 | 1 | 5678bbbb |

Figure 10A:
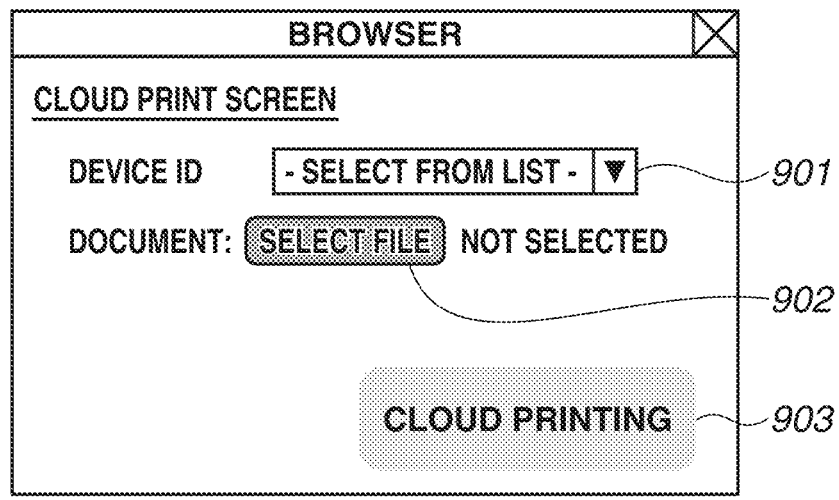
FIGS. 10A, 10B, and 10C illustrate examples of print screens displayed by a terminal.

In S412, based on the cloud user authority information acquired by the print unit 305 in S411, the print unit 305 transmits a print screen response to the web browser 301. This time, since the user authority to perform the print processing is given to the cloud user, the print screen for performing the print processing is returned. FIG. 10A illustrates an example of the print screen in this case.

Figure 10B:
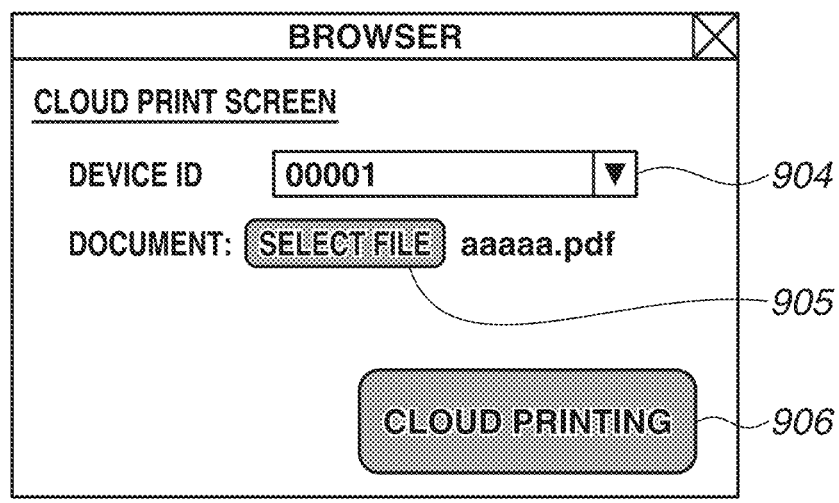
Figure 10C:
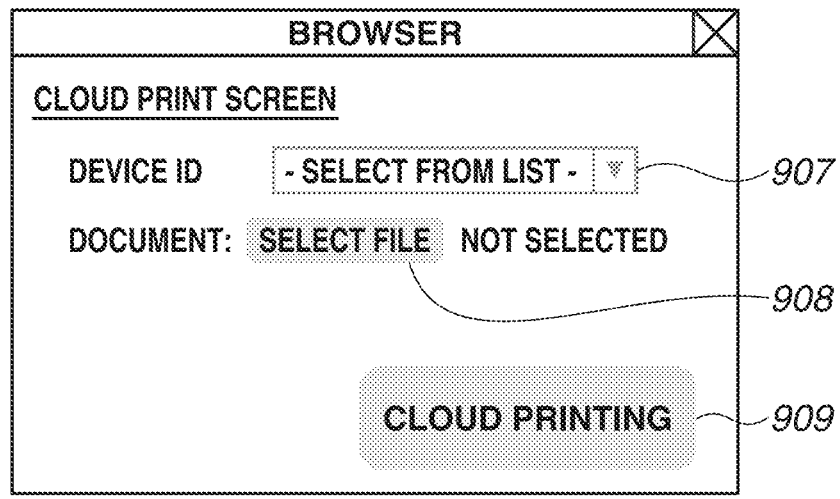

Referring to FIGS. 10A to 10C, a portion 903 with a faint color indicates a state where selection by the user is not possible. The print screen illustrated in FIG. 10A displays a "Cloud Printing" button 903 for performing cloud printing, a pull-down selector 901 for selecting the device ID as identification information of the device 105, and a "Select File" button 902 for acquiring a document to be printed in cloud printing. The above-described method for displaying a device ID list in the pull-down selector 901 is a general display method for selecting a printer in the web browser 301 when performing the print processing, and the description thereof will be omitted.

The user selects the device 105 as a transmission destination of a request for cloud printing by using the pull-down selector 901 and selects a file by using the "Select File" button 902. The above-described method for selecting a file existing in a cloud environment, such as the service server 104, by pressing the "Select File" button 902 is a common method, and the description thereof will be omitted. FIG.

10B illustrates an example of the print screen to be displayed after selecting a file. As a result of selecting the device ID "00001" and the document "aaaaa.pdf" in the print screen illustrated in FIG. 10A, the "Cloud Printing" button 903 disabled in the print screen illustrated in FIG. 10A is changed to a "Cloud Printing" button 906 enabled in the print screen illustrated in FIG. 10B.

When the invalidity of the cloud user authority to perform the print processing is confirmed in S410, a screen as illustrated in FIG. 10C is displayed on the web browser 301. Referring to FIG. 10C, all of portions 907 to 909 displayed thereon are disabled.

In S413, the web browser 301 receives an operation as a request for cloud printing for the device 105 when the user presses the "Cloud Printing" button 906 in the print screen (see FIG. 10B). In S414, the web browser 301 transmits a request for cloud printing to the print unit 305. In this processing, the device identification information on the device 105 selected in S904 is also transmitted.

In S415 and S416, similar to the processing in S410 and S411, the print unit 305 acquires the cloud user authority information for performing the print processing from the authentication unit 303. When the cloud user authority is confirmed to be given in S416, the processing proceeds to S417. On the other hand, when the cloud user authority is invalidated, the print unit 305 returns an error to the web browser 301, and the sequence ends. The print unit 305 acquires the cloud user authority information before and after transmitting a request for cloud printing (S414) because the cloud user authority may be invalidated by an operation of the owner between a cloud user authority information response in S411 and a request for cloud printing in S414. Therefore, each time the service server 104 receives a request for cloud printing from the user, the service server 104 confirms the user authority. This also applies to processing in S511 (described below) in which the device 105 receives a request for scan uploading from the user.

When the cloud user authority to perform the print processing is confirmed to be given in S416, in S416.5, the print unit 305 issues print job identification information to the cloud user UUID. The print job identification information is identification information for uniquely identifying a print job for which the cloud user identified by the cloud user UUID requested the device 105 identified by the device ID. Table 2B illustrates an example of the print job table stored in the print unit 305. "Print job UUID" in Table 2B is equivalent to the print job identification information and is a unique value for uniquely identifying a print job. The "Status" value in Table 2B indicates whether the print job identified by the print job UUID is being executed or completed.

More specifically, it is assumed that the cloud user identified by the cloud user UUID "CCC1" selects the device ID "00001" in the print screen illustrated in FIG. 10B, and the validity of the cloud user authority information is confirmed in S416. As a result, in S416.5, the print unit 305 issues the print job UUID "90123456".

TABLE 2B

| Cloud user UUID | Print job UUID | Device ID | Status |
|---|---|---|---|
| CCC1 | 90123456 | 00001 | Executing |
| CCC1 | 90123450 | 00002 | Completed |
| CCC2 | 90123444 | 00001 | Executing |

In S417, the print unit 305 transmits a request for cloud printing, together with the device ID and the cloud user UUID, to the communication control unit 304. This time, for the record identified by the cloud user UUID "CCC1", the print job UUID "90123456", and the device ID "00001", the "Status" value is "Executing".

In S418, the communication control unit 304 transmits a request for acquiring the local user UUID to the authentication unit 303. In this processing, the cloud user UUID and the device ID are also transmitted. In S419, based on the device ID and the cloud user UUID received in S418, the authentication unit 303 uniquely identifies the local user UUID. When identifying the local user UUID, the authentication unit 303 uses a mapping table pre-stored in the authentication unit 303. Table 3 illustrates an example of the mapping table.

According to the present exemplary embodiment, any specific method for generating association information for the local user UUID and the cloud user UUID as illustrated in Table 3 is applicable. More specifically, the authentication server 103 receives the authentication cooperation information input by the user via the web browser 301 and generates association information (hereinafter referred to as first association information) for the cloud user UUID and the authentication cooperation information via the received authentication cooperation information. Then, the authentication server 103 receives the authentication cooperation information input by the user via the web browser 307 and generates association information (hereinafter referred to as second association information) for the local user UUID and the authentication cooperation information via the received authentication cooperation information. If the authentication cooperation information included in the first and the second association information is identical, the local user UUID and the cloud user UUID are associated with each other by the authentication server 103 via the authentication cooperation information.

TABLE 3

| Device ID | Local user UUID | Cloud user UUID |
|---|---|---|
| 00001 | AAA1 | CCC1 |
| 00001 | AAA2 | CCC2 |

In S420, the authentication unit 303 transmits the local user UUID identified in S419 to the communication control unit 304. Referring to Table 3, when the cloud user UUID is "CCC1", the local user UUID "AAA1" is to be transmitted to the communication control unit 304. In S421, the communication control unit 304 transmits a publish message as a request for cloud printing, together with the local user UUID and the print job UUID, to the function call unit 310. The topic in this case is specified by the device identification information of the device 105. This allows the communication control unit 304 to transmit a publish message to the same topic as the subscribe message transmitted by the function call unit 310 in S402.

In S422, the function call unit 310 transmits a request for cloud printing, together with the local user UUID, to the printing unit 311. In S423, the printing unit 311 transmits a request for acquiring local user authority information for performing the print processing to the authentication server cooperation unit 309.

In S424, the authentication server cooperation unit 309 transmits the local user authority information to the printing unit 311. More specifically, based on an authority table included in the authentication server cooperation unit 309, the authentication server cooperation unit 309 identifies the local user authority information to be transmitted to the printing unit 311. Table 4 illustrates an example of the authority table included in the authentication server cooperation unit 309. Table 4 manages "User authority to perform print processing" and "User authority to perform scan upload processing" for each local user UUID. Referring to Table 4, for the local user UUID "AAA1" at this time, the user authority to perform the print processing is confirmed to have been given.

TABLE 4

| Local user UUID | User authority to perform print processing | User authority to perform scan upload processing |
|---|---|---|
| AAA1 | 1 | 1 |
| AAA2 | 0 | 1 |

After the validity of the local user authority to perform the print processing is confirmed, in S425, the printing unit 311 performs the print processing. In this processing, the print processing is performed for the local user identified by the local user UUID received in S422. Upon completion of the print processing, in S426, the printing unit 311 transmits a result of the print processing, together with the local user UUID, to the function call unit 310.

In S427, the function call unit 310 transmits a result of the print processing, together with the local user UUID and the device ID, to the communication control unit 304. In S428, the communication control unit 304 transmits a request for acquiring the cloud user UUID to the authentication unit 303. In this processing, the communication control unit 304 transmits the device ID and the local user UUID received together with the result of the print processing. In S429, the authentication unit 303 transmits the cloud user UUID to the communication control unit 304. The cloud user UUID transmitted at this time is identified by using Table 3 and the received device ID and the local user UUID.

In S430, the communication control unit 304 transmits the result of the print processing to the print unit 305. By using the local user UUID included in the information received at this time, the communication control unit 304 can return the result of the print processing to the cloud user who requested cloud printing. This completes the processing in which the terminal 102 transmits a request to the service server 104.

Processing in which the device 105 transmits a request to the service server 104 will be described below with reference to FIG. 5. FIG. 5 is a sequence diagram illustrating processing in which the terminal 102 transmits a request. The present exemplary embodiment will be described below on the premise that a request from the device 105 to the service server 104 is a scan upload instruction for uploading data scanned by the device 105 to the service server 104.

In S501, the web browser 307 receives a login operation from the user. In S502, the web browser 307 transmits a request for login processing to the authentication server cooperation unit 309. This login processing is performed based on an authentication method defined in the authentication server cooperation unit 309. Examples of authentication methods include a method for verifying the combination of a user ID and a password. The present exemplary embodiment will be described below centering on the combination of a local user ID and a password as an example. Table 5 illustrates an example of the local user table of the authentication server cooperation unit 309.

TABLE 5

| Local user ID | Local user UUID | Password |
|---|---|---|
| admin | AAA1 | admin |
| user | AAA2 | user |

In S503, the authentication server cooperation unit 309 authenticate a local user based on the combination of a local user ID and a password with reference to Table 5. For example, with the local user ID "admin" and the password "admin", the authentication server cooperation unit 309 authenticates the user as a user having the local user ID "admin".

In S504, the authentication server cooperation unit 309 generates and stores the local user authentication information of the authenticated user. This local user authentication information is stored in an effective state until the user performs a logout operation (not illustrated) or a set time comes. The local user authentication information stores the local user ID and local user UUID of the authenticated user. Thus, the local user authentication information includes almost the same information as the local user information illustrated in Table 5. The information storage configuration is not limited to a configuration in which the authentication server cooperation unit 309 directly stores the local user authentication information. The authentication server cooperation unit 309 may store a token associated with the local user authentication information and, referring to the token, use the local user authentication information stored in a location different from the authentication server cooperation unit 309.

In S505, the authentication server cooperation unit 309 transmits a result of the login operation, together with the local user UUID, to the web browser 307. The local user UUID transmitted at this time is "AAA1". In S506, the web browser 307 receives from the user an operation as a request for the scan upload screen for scan uploading. In S507, the web browser 307 transmits a request for the scan upload screen, together with the local user UUID, to the scan uploading unit 312.

In S508, the scan uploading unit 312 transmits a request for acquiring the local user authority information for scan uploading to the authentication server cooperation unit 309. In S509, the authentication server cooperation unit 309 transmits the local user authority information to the scan uploading unit 312. More specifically, based on the authority table included in the authentication server cooperation unit 309, the authentication server cooperation unit 309 identifies the local user authority information to be transmitted to the scan uploading unit 312. An example of the authority table included in the authentication server cooperation unit 309 is as illustrated in Table 4. Referring to Table 4, since the local user UUID is "AAA1" at this time, the validity of the local user authority for scan uploading can be confirmed.

Figure 11A:
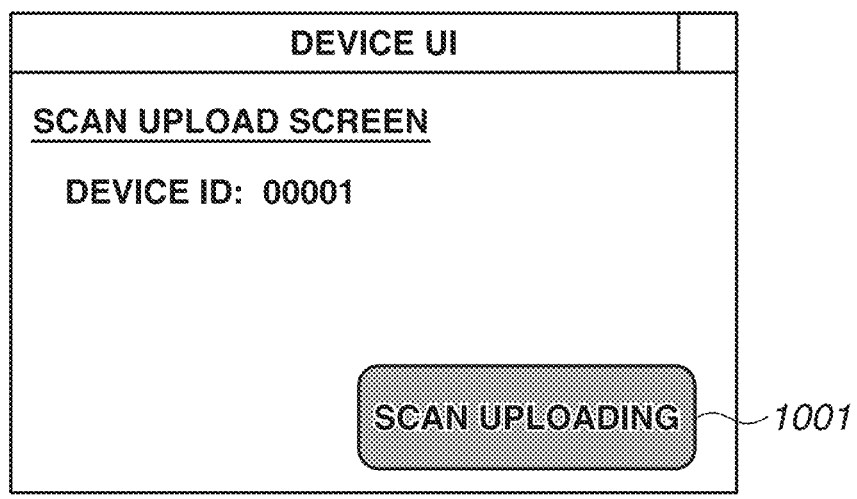
FIGS. 11A and 11B illustrate examples of scan upload screens displayed by the device.
Figure 11B:
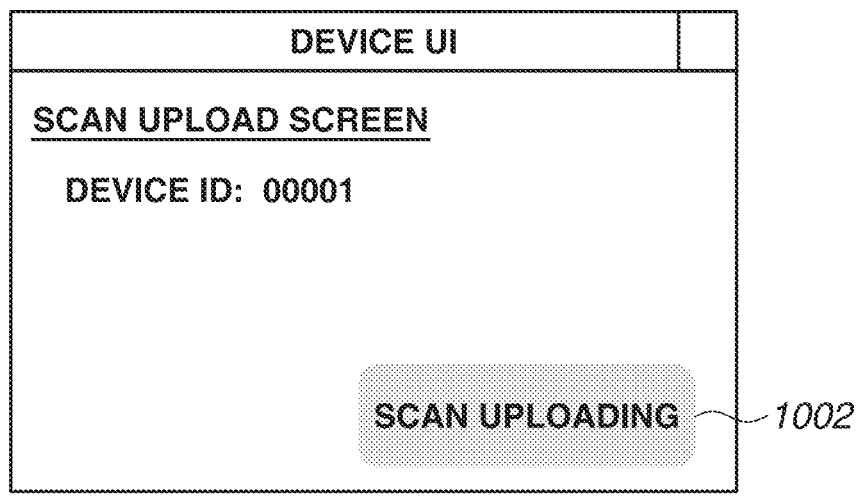

In S510, based on the local user authority information received in S509, the scan uploading unit 312 transmits a scan upload screen as a response to the web browser 307. FIG. 11A illustrates an example of the scan upload screen. The screen illustrated in FIG. 11A displays a button 1001 for scan uploading and the device ID "00001". FIG. 11B illustrates an example of the scan upload screen when the local user authority is invalidated. The button 1002 illustrated in FIG. 11B is not executable by the user.

When the user presses the button 1001 illustrated in FIG. 11A, in S511, the web browser 307 receives an operation as a request for scan uploading from the user. The web browser 307 receives the operation as a request for scan uploading from the user after the paper to be scanned is set at a predetermined portion of the device 105.

In S512, the web browser 307 transmits a request for scan uploading, together with the local user UUID, to the scan uploading unit 312. S513 and S514 perform processing for confirming the validity of the local user authority information as in the processing in S508 and S509. When the validity of the scan upload authority is confirmed in S514, the processing proceeds to S515. In S515, when the local user authority is invalidated, the scan uploading unit 312 returns an error to the web browser 307. Then, the processing ends.

After the validity of the local user authority is confirmed, in S515, the scan uploading unit 312 performs the scan processing. In S516, to upload the scan data acquired in S515 to the service server 104, the scan uploading unit 312 transmits a request for scan uploading to the function call unit 310. In this processing, the local user UUID is also transmitted. In S517, the function call unit 310 transmits the local user UUID, the device ID, and the scan data received in S516 to the communication control unit 304.

In S518, the communication control unit 304 transmits a request for acquiring the cloud user UUID to the authentication unit 303. In this processing, the local user UUID and the device ID of the device 105 notified in S517 are also transmitted. In S519, based on the local user UUID and the device ID received in S518, the authentication unit 303 uniquely identifies the cloud user UUID. When identifying the cloud user, the authentication unit 303 uses the mapping table (see Table 3) included in the authentication unit 303. As a result, the cloud user UUID "CCC1" is identified. In S520, the authentication unit 303 transmits the cloud user UUID identified in S519 to the communication control unit 304.

In S521, the communication control unit 304 transmits a request for storing the scan data to the scan upload unit 306. In this processing, the scan data uploaded in S517 and the cloud user UUID acquired in S520 are also transmitted.

In S522, the scan upload unit 306 transmits a request for acquiring the cloud user information, to the authentication unit 303. In S523, the authentication unit 303 transmits the scan upload authority information of the cloud user, to the scan upload unit 306. More specifically, based on the authority table included in the authentication unit 303, the authentication unit 303 identifies the cloud user authority information for the scan upload unit 306. An example of the authority table included in the scan upload unit 306 is as illustrated in Table 2A. Referring to Table 2A, since the cloud user UUID is "CCC1" at this time, the validity of the cloud user authority is confirmed After the validity of the cloud user authority information is confirmed in S523, in S524, the scan upload unit 306 performs processing for storing the scan data. In this processing, as a cloud user identified by the cloud user UUID received by the scan upload unit 306 in S521, the scan upload unit 306 performs processing for storing the scan data. When the invalidity of the cloud user authority information is confirmed in S523, the processing for storing the scan data is not performed, and error information is notified to the user via the web browser 307. After the scan data is stored in S524, in S525, the scan upload unit 306 transmits the result of the processing to the web browser 307 to notify the user of the completion of scan data uploading. This completes the processing in which the device 105 transmits a request to the service server 104.

Although the processing for storing the scan data in the service server 104 has been described above, the configuration of storing the scan data is not limited thereto. The scan data may be transmitted to a storage server (not illustrated) different from the service server 104.

Processing in which the owner gives the user authority to the user via the owner device 106 will be described below with reference to FIGS. 6 and 7. FIG. 6 is a sequence diagram illustrating processing for validating the user authority to execute a cloud print request. FIG. 7 is a sequence diagram illustrating processing for validating the user authority to execute a scan upload request. The above-described processing illustrated in FIGS. 4 and 5 is performed after completion of the processing illustrated in FIGS. 6 and 7.

The present exemplary embodiment will be described below centering on a cloud print request as a request to be transmitted from the service server 104 to the device 105 and on a scan upload request as a request to be transmitted from the device 105 to the service server 104. In the processing that has already been described above, identical processes are assigned the same reference numerals, and the detailed description thereof will be omitted.

Processing for giving the user authority to perform cloud printing to the user will be described below with reference to FIG. 6. In S603, the web browser 313 of the owner device 106 receives an operation for requesting the authority setting screen from an owner. In S604, the web browser 313 transmits a request for the authority setting screen to the authentication unit 303. In S605, the authentication unit 303 transmits the authority setting screen to the web browser 313. FIG. 12 illustrates an example of the authority setting screen. Referring to FIG. 12, the "Print" column and the "Scan upload" column are provided for "Cloud User ID". The cloud user authority information for performing the print processing to be validated can be selected by checking the check box in the "Print" column. The user authority to be validated can also be selected by checking the check box in the "Scan Upload" column.

When the user presses the "Set Authority" button in the authority setting screen illustrated in FIG. 12, in S606, the web browser 313 receives an operation for validating the user authority selected in the screen illustrated in FIG. 12. In S607, the web browser 313 transmits a request for validating the user authority to the authentication unit 303. In this processing, the cloud user UUID selected in S606 is also transmitted.

In S608, the authentication unit 303 gives the local user authority to perform the print processing. More specifically, based on the mapping table illustrated in Table 3, the authentication unit 303 identifies the local user UUID associated with the cloud user UUID received in S607. Then, the authentication unit 303 gives the user authority to perform the print processing to the identified local user UUID. As a result, the authentication unit 303 manages information for associating the local user UUID with the user authority by using a table. Table 6 illustrates an example of the table generated in this case.

TABLE 6

| Device ID | Local user UUID | User authority to perform print processing | User authority to perform scan upload processing |
|---|---|---|---|
| 00001 | AAA1 | 1 | 1 |
| 00001 | AAA2 | 0 | 1 |

If the authority table as illustrated in Table 6 has already been generated and the local user authority is invalidated, the authentication unit 303 updates the values in Table 6 according to the contents of the request received in S607. More specifically, for "User authority to perform print processing" illustrated in Table 6, the authentication unit 303 changes the value from "0" to "1". Table 6 illustrates the table after the user authority is updated.

In S609, based on Table 6, the authentication unit 303 transmits a request for giving the local user authority, together with the device ID, to the communication control unit 304. This processing corresponds to the processing for maintaining the consistency between the local user authority table (see Table 6) included in the authentication server 103 and the local user authority table (see Table 4) included in the device 105.

In S610, the communication control unit 304 transmits to the function call unit 310 a publish message as a request for giving the local user authority. The topic in this case is the device ID, and the local user UUID is transmitted together with the publish message. In S611, the function call unit 310 transmits a request for giving the local user authority, together with the local user UUID, to the authentication server cooperation unit 309. In S612, based on the local user UUID received in S611, the authentication server cooperation unit 309 updates the data of the local user authority table (see Table 4).

In S613 to 615, the authentication server cooperation unit 309 transmits a result as a response to the request for giving the local user authority to the authentication unit 303 via the function call unit 310 and the communication control unit 304. In this processing, the local user UUID is transmitted together with the result.

In S616, the communication control unit 304 gives, to the authentication unit 303, the cloud user authority associated with the cloud user UUID received in S607. More specifically, in the cloud user authority table (see Table 2A) included in the authentication unit 303, the authentication unit 303 changes the value of the cloud user authority from "0" to "1". The processing in S616 makes it possible to synchronize the user authority information between the local user authority table (see Table 6) included in the authentication server 103 and the cloud user authority table (see Table 2A). This completes the processing for giving the user authority to perform the print processing.

Processing for giving the user authority for scan uploading to the user will be described below with reference to FIG. 7. In processing that has already been described above, identical processes are assigned the same reference numerals, and the detailed description thereof will be omitted.

In S701, the web browser 313 receives from the user an operation as a request for giving the user authority for scan uploading. FIG. 12 illustrates an example of the screen of the web browser 313 used by the user to perform an operation. In S702, the web browser 313 transmits a request for giving the user authority, together with the cloud user UUID selected in S701, to the authentication unit 303.

In S703, the authentication unit 303 validates the cloud user authority associated with the cloud user UUID received in S702. More specifically, in the cloud user authority table (see Table 2A) included in the authentication unit 303, the authentication unit 303 changes the value of the cloud user authority from "0" to "1". In S704, the authentication unit 303 gives the local user authority. More specifically, based on the cloud user tables (see Tables 2A and 2B) and the mapping table (see Table 3), the authentication unit 303 changes the value of the scan upload authority from "0" to "1" in the local user authentication table (see Table 6). However, S703 and S704 may be performed in any order.

In S705, the authentication unit 303 transmits a request for giving the local user authority, together with the device ID, to the communication control unit 304. The request in S705 is transmitted to synchronize information between the local user authority table (see Table 6) included in the authentication server 103 and the local user authority table (see Table 4) included in the device 105.

In S706, the communication control unit 304 transmits a publish message as a request for giving the local user authority, together with the local user UUID received in S705, to the function call unit 310. The topic in this case is the device ID.

In S707, the function call unit 310 transmits a request for giving the local user authority, together with the local user UUID, to the authentication server cooperation unit 309. In S708, the authentication server cooperation unit 309 updates the local user authority information identified by the local user UUID. More specifically, in the local user authority table (see Table 4), the authentication server cooperation unit 309 changes the value of the local user authority associated with the local user UUID from "0" to "1". This completes the processing for giving the user authority for scan uploading to the user.

The present exemplary embodiment will be described below centering on a case of cloud printing and a case of scan uploading. Assume a case of invalidating the user authority after receiving a request while preventing a new request from being received according to preset device use limitations. Processing for managing the user authority in this case so that the received request can be executed will be described below.

Processing in which the owner invalidates the user authority to perform the print processing during execution of the print processing by the device 105 will be described below with reference to FIG. 8. In processing that has already been described above, identical processes are assigned the same reference numerals, and the detailed description thereof will be omitted.

After the service server 104 transmits a printing request to the device 105 in S421, in S722, the web browser 313 receives an operation for requesting the authority setting screen from the owner. In S723, the web browser 313 transmits a request for the authority setting screen to the authentication unit 303. In S724, the authentication unit 303 transmits the authority setting screen to the web browser 313. An example of the authority setting screen is as illustrated in FIG. 12.

In S725, the web browser 313 receives an operation of a request for invalidating the cloud user authority to perform the print function. More specifically, referring to FIG. 12, the user un-checks the check boxes of items for which the cloud user authority is to be invalidated and presses the "Set Authority". In S726, the web browser 313 transmits a request for invalidating the cloud user authority, together with the cloud user UUID, to the authentication unit 303.

In S727, the authentication unit 303 invalidates the cloud user authority associated with the cloud user UUID received in S726. More specifically, in the cloud user authority table (see Table 2A) included in the authentication unit 303, the authentication unit 303 changes the value of the cloud user authority from "1" to "0".

In S728, the authentication unit 303 transmits a request for confirming completion of printing to the print unit 305. When the print unit 305 receives the request in S728, the print unit 305 can confirm whether a printing result has been returned thereto in response to the request for cloud printing transmitted from the print unit 305 to the communication control unit 304 in S417. The print unit 305 waits for reception of a printing result until it confirms a printing result.

After the print unit 305 receives a printing result from the communication control unit 304 in S430, in S729, the print unit 305 transmits a response to the request for confirming completion of printing to the authentication unit 303 to notify the authentication unit 303 that the device 105 has completed the print processing. After confirming that the print unit 305 has completed the print processing, in S730, the authentication unit 303 invalidates the local user authority to perform the print processing. More specifically, the authentication unit 303 identifies the local user UUID based on the mapping table (see Table 3). Then, in the local user authority table illustrated in Table 6, the authentication unit 303 changes the value of the local user authority from "1" to "0".

In S731, the authentication unit 303 transmits a request for invalidating the local user authority to the communication control unit 304. This request is for synchronizing information between the local user authority table (see Table 6) included in the authentication server 103 and the local user authority table (see Table 4) included in the device 105. In S731, based on the local user authority table (see Table 6) included in the authentication unit 303, the authentication unit 303 adds the device ID associated with the request. The local user UUID identified in S730 is also transmitted.

In S732, the communication control unit 304 transmits a publish message as a request for invaliding the local user authority to perform the print function, together with the local user UUID, to the function call unit 310. The topic in this case is the device ID. In S733, the function call unit 310 transmits the local user UUID and transmits a request for invalidating the local user authority to the authentication server cooperation unit 309. In S734, based on the local user UUID received in S733, the authentication server cooperation unit 309 updates the data of the local user authority table (see Table 4). More specifically, the authentication server cooperation unit 309 changes the value of the local user authority from "1" to "0".

This completes the processing in which the owner invalidates the user authority to perform the print processing during execution of the print processing by the device 105. A request received before invalidating the cloud user authority can be executed by invalidating the local user authority to perform the print processing after confirming that the device 105 has completed the print processing.

Although, in the sequence diagram illustrated in FIG. 8, the owner performs the processing for invalidating the cloud user authority via the web browser 313 in S722 to S727 after the function call unit 310 receives a publish message for performing the print processing in S421, the processing is not limited thereto. The print processing can be performed as long as the authentication server 103 performs the processing for invalidating the cloud user authority in S727 after the communication control unit 304 receives a print request in S417.

The processing in which the owner invalidates the user authority to perform the scan upload function during execution of the scan upload processing by the service server 104 will be described below with reference to FIG. 9 (consisting of FIGS. 9A and 9B). In the processing that has already been described above, identical processes are assigned the same reference numerals, and the detailed description thereof will be omitted.

After the authentication unit 303 transmits a request for acquiring the cloud user authority to the service server 104 in S523, in S824, the web browser 313 receives an operation for requesting the authority setting screen from the owner. In S825, the web browser 313 transmits a request for acquiring the authority setting screen to the authentication unit 303. In S826, the authentication unit 303 transmits the authority setting screen as a response to the web browser 313. An example of the authority setting screen is as illustrated in FIG. 12. In S827, the web browser 313 receives an operation as a request for invalidating the user authority to perform the scan upload processing. The specific operation method is similar to that in S725.

In S828, the web browser 313 transmits a request for invalidating the user authority, together with the cloud user UUID, to the authentication unit 303. In this processing, the cloud user UUID selected in S829 is also transmitted. In S829, the authentication unit 303 invalidates the local user authority. The cloud user authority is validated in S727, while the local user authority is invalidated in S829. The order of invalidating the user authority in S727 and S829 is determined by the job type (printing or scan uploading) selected in the authority control screen illustrated in FIG. 12. Information about the selected job type is transmitted in S828. Then, the authentication unit 303 identifies the order of invalidating the user authority.

In S829, more specifically, the authentication unit 303 identifies the local user UUID based on the mapping table (see Table 3) and, based on the identified local user UUID, changes the value of the local user authority information from "1" to "0" in Table 6.

In S830, the authentication unit 303 transmits a request for invalidating the local user authority to the communication control unit 304. In S831, the communication control unit 304 transmits a publish message as a request for invalidating the local user authority, together with the local user UUID, to the function call unit 310. The topic in this case is the device ID. In S832, the function call unit 310 transmits a request for invalidating the local user authority, together with the local user UUID, to the authentication server cooperation unit 309.

In S833, based on the local user UUID received in S832, the authentication server cooperation unit 309 updates the data of the local user authority table (see Table 4). More specifically, the authentication server cooperation unit 309 changes the value of the local user authority information associated with the local user UUID from "1" to "0". In S834 to S837, the authentication server cooperation unit 309 transmits a processing result as a response to the request for invalidating the local user authority to the scan upload unit 306 via the function call unit 310, the communication control unit 304, and the authentication unit 303. In this processing, the local user UUID is also transmitted. This allows the scan upload unit 306 to receive a processing result as a response to the request for storing the scan data received in S521.

After the scan uploading unit 312 has completed the scan data storage processing, in S838, the scan upload unit 306 transmits a response to a request for confirming completion of scan uploading to the authentication unit 303.

In S839, the authentication unit 303 invalidates the cloud user authority associated with the cloud user UUID received in S838. More specifically, in the cloud user authority table (see Table 2A) included in the authentication unit 303, the authentication unit 303 changes the value of the cloud user authority information from "1" to "0". This completes the processing in which the owner invalidates the user authority to perform the scan upload function from the user. A request received before invalidating the local user authority can be executed by invalidating the cloud user authority to perform the scan upload processing after confirming that the service server 104 has completed the scan upload processing.

In the device 105 or the service server 104, processing may fail because of a certain cause. For example, in the print processing, processing may fail because of paper jam or part failure. Also, in the scan data storage processing, processing may be interrupted because the load on a scan data storage destination server exceeds the maximum value.

A second exemplary embodiment will be described below centering on processing for managing, in a case where processing for a request received before invalidating the user authority fails, the user authority to complete the failed processing. Portions not described in the second exemplary embodiment are similar to those according the first exemplary embodiment.

Processing for managing the user authority in a case where the device 105 fails processing during execution will be described below with reference to FIG. 13. However, as in the first exemplary embodiment, description will be made centering on a case where the filed processing is the print processing. In the processing that has already been described above, identical processes are assigned the same reference numerals, and the detailed description thereof will be omitted.

After the printing unit 311 acquires the local user authority information from the authentication server cooperation unit 309 in S424, in S1331, the printing unit 311 fails the print processing. A failure in the print processing refers to the print processing that was not completed because of paper jam or part failure.

Figure 18:
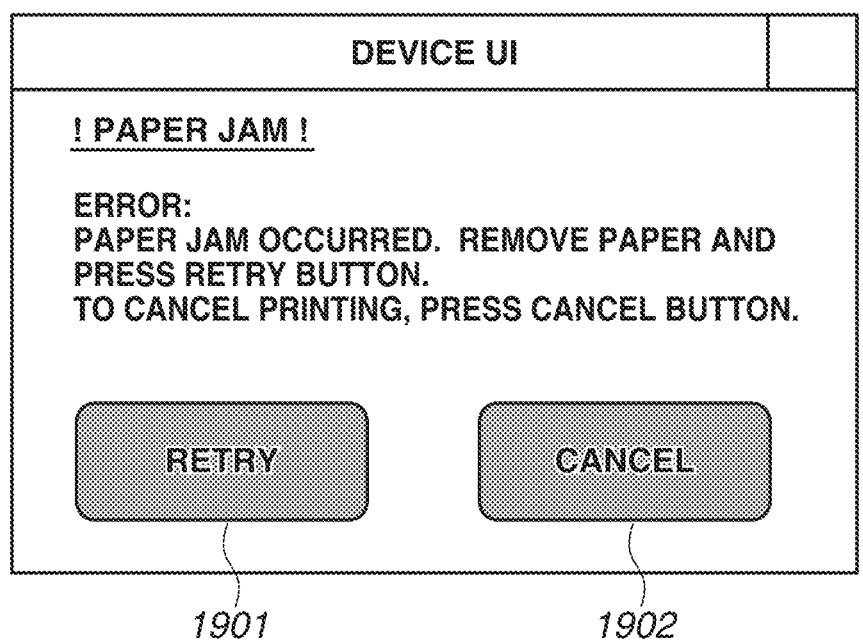
FIG. 18 illustrates an example of a screen for notifying that the print processing has failed according to the second exemplary embodiment.

In S1332, the printing unit 311 transmits to the web browser 307 a request for displaying a screen for notifying the user that the print processing failed. FIG. 18 illustrates an example of the screen requested for display. Referring to FIG. 18, the screen displays the reason why the print processing has failed, a Retry button 1901 for re-performing the failed print processing, and a Cancel button 1902 for canceling the failed print processing. This time, the printing unit 311 fails the print processing because of a paper jam. When the Cancel button 1902 is pressed, the processing proceeds to S1333. On the other hand, when the Retry button 1901 is pressed, the printing unit 311 performs processing (not illustrated) for re-performing the print processing.

In S1333, the web browser 307 receives an operation for canceling the print processing from the user. In S1334, the web browser 307 transmits a request for canceling the print processing to the printing unit 311. In S1335, the printing unit 311 cancels the print processing failed in S1332. In S1336, the printing unit 311 transmits to the function call unit 310 a request for transmitting a processing result (failed result) of the print processing in S1332. In this processing, the local user UUID and the print job UUID acquired by the printing unit 311 in S421 are also transmitted.

In S1337, the function call unit 310 transmits a processing result, together with the local user UUID and the print job UUID, to the communication control unit 304. This processing serves as a print processing failure response to the print request in S421. In S1338, the communication control unit 304 transmits the print job UUID and a processing result to the print unit 305. In S1339, the print unit 305 transmits, to the authentication unit 303, a printing result and the print job UUID as a response to the request for confirming completion of printing.

In S1340, the authentication unit 303 stores the cloud user UUID and the print job UUID in an associative way. More specifically, the authentication unit 303 gives, to the user the cloud, user authority to perform the print processing so that only the print job identified by the print job UUID received in S1339 can be executed. The authentication unit 303 issues a failed print job UUID as failed job identification information for identifying the failed print job for the cloud user UUID and manages these UUIDs in an associative way. Table 7 illustrates an example of the failed print job table managed.

TABLE 7

| Cloud user UUID | Failed print job UUID |
| --- | --- |
| CCC1 | 00123456 |
| CCC1 | 00123457 |
| CCC2 | 00123450 |

The authentication unit 303 confirms the cloud user authority table (see Table 2A) and determines whether the cloud user authority to perform the print processing is given. When the cloud user authority is determined to be invalidated, the authentication unit 303 confirms the failed print job table (see Table 7). When the authentication unit 303 confirms a pair of the relevant cloud user UUID and the corresponding failed print job UUID, the authentication unit 303 validates the cloud user authority identified by the cloud user UUID.

In S1341, based on the result in S1340, the authentication unit 303 invalidates the local user authority. However, the local user authority associated with the print job UUID received in S1339 is assumed to be validated. More specifically, based on the cloud user table (see Table 1) and the mapping table (see Table 3), the authentication unit 303 performs processing for changing the value of the local user authority from "1" to "0" in the local user authentication table (see Table 6). In this processing, the authentication unit 303 acquires the local user UUID based on the mapping table (see Table 3) and registers the record of the failed print job UUID of the local user UUID. Table 8 illustrates an example of the table generated through the registration. "Device ID" in Table 8 is identification information of the transmission destination device to which the print processing can be transmitted. For all devices to which the print processing can be transmitted, the device ID, the local user UUID, and the failed print job UUID are registered in table 8 in an associative manner. For example, when the device 105 has the device ID "00001", the device IDs "00002" and "00003" are managed for devices (not illustrated) other than the device 105 in Table 8.

TABLE 8

| Device ID | Local user UUID | Failed print job UUID |
| --- | --- | --- |
| 00002 | AAA1 | 00123456 |
| 00002 | AAA2 | 00123450 |
| 00003 | AAA1 | 00123456 |
| 00003 | AAA2 | 00123450 |

Although, in this embodiment, the start of the processing for invalidating the local user UUID in S1341 is triggered by the processing in S1340, the processing is not limited thereto. The processing for invalidating the local user UUID in S1341 may be started upon reception of a printing result (result of failed printing) and the print job UUID in S1339.

In S1342, the authentication unit 303 transmits a request for invalidating the local user print authority for other than the failed job to the communication control unit 304. This processing is for synchronizing information between the local user authority table (see Table 6) included in the authentication server 103 and the local user authority table (see Table 4) included in the device 105. The request is also for synchronizing information between the local user failed print job table (see Table 8) and Table 9 (described below) included in the authentication server 103. In this processing, based on the local user authority table (see Table 6), the device ID associated with the request, the local user UUID, and the failed print job UUID received in S1339 are also transmitted.

In S1343, the communication control unit 304 transmits a publish message as a request for invalidating the local user authority, together with the local user UUID and the print job UUID, to the function call unit 310. The topic in this case is the device ID. In S1344, the function call unit 310 transmits a request for invalidating the local user authority, together with the local user UUID and the print job UUID, to the authentication server cooperation unit 309.

In S1345, based on the local user UUID received in S1344, the authentication server cooperation unit 309 updates the data in the local user authority table (see Table 4). More specifically, the authentication server cooperation unit 309 changes the local user authority from "1" to "0". The authentication server cooperation unit 309 also registers the failed print job table based on the print job UUID received in S1344. Table 9 illustrates an example of the failed print job table. Referring to Table 9, the failed print job UUID is managed in association with the local user UUID.

TABLE 9

| Local user UUID | Failed print job UUID |
|---|---|
| AAA1 | 00123456 |
| AAA2 | 00123450 |

In S1345, if the failed job is known not to be re-executed by the device 105, all of the local user authorities may be invalidated. This completes the processing for managing the user authorities when the device 105 fails the print processing.

Processing in which another device re-executes a failed print job will be described below with reference to FIG. 14. In processing that has already been described above, identical processes are assigned the same reference numerals, and the detailed description thereof will be omitted.

After the user logs into the authentication server 103 in S401 to S407, in S1408, the web browser 301 receives a user operation for requesting the failed job print screen for re-entering the failed print job. In S1409, the web browser 301 transmits a request for the failed job print screen to the print unit 305.

In S1410, the print unit 305 transmits a request for acquiring the cloud user authority information to the authentication unit 303. In this processing, based on the cloud user authority table (see Table 2A) included in the authentication unit 303, the authentication unit 303 confirms whether the cloud user authority information for performing the print processing is given. Referring to Table 2A, when the cloud user authority is invalidated, the authentication unit 303 further refers to the cloud user failed print job table (see Table 7). As a result of referring to Table 7, when the cloud user UUID is confirmed to be included in Table 7, the cloud user authority to execute the failed print job associated with the cloud user UUID is given. On the other hand, when the cloud user UUID in Table 7 is confirmed not to be included in Table 7, the print unit 305 transmits a screen for notifying that there is no re-executable failed job as a response to the request in S1409.

Figure 17:
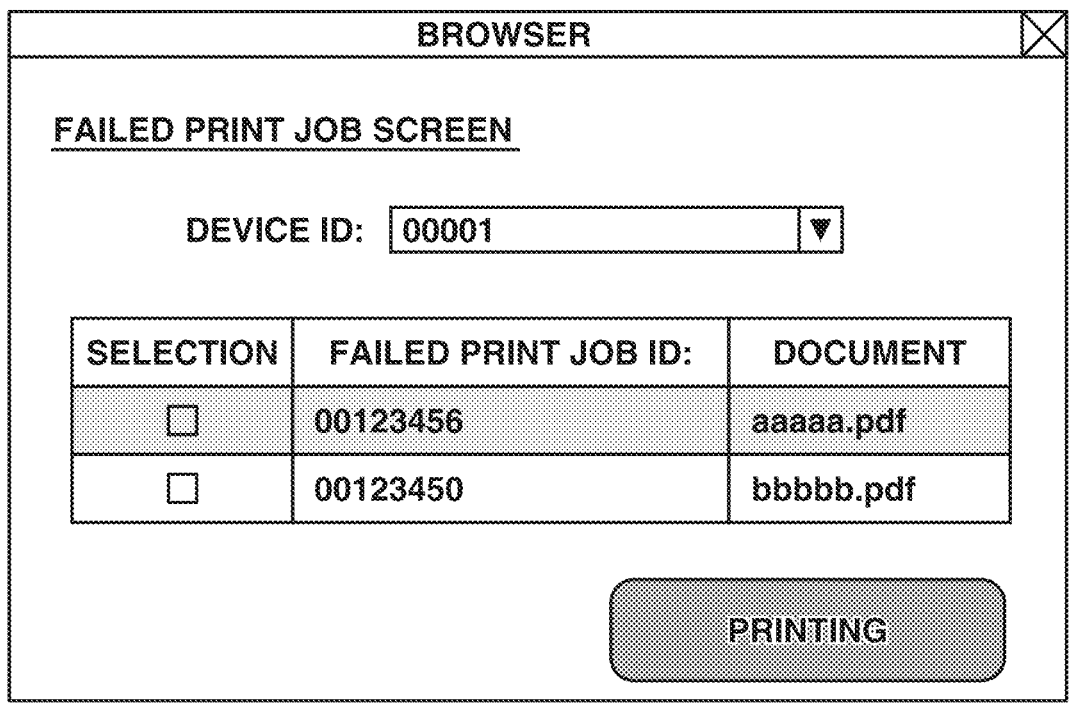
FIG. 17 illustrates an example of a failed job print screen.

In S1411, the authentication unit 303 transmits to the print unit 305 the cloud user authority information as a response to the request in S1410. In S1412, based on the cloud user authority information acquired in S1411, the print unit 305 transmits a failed job print screen to the web browser 301. FIG. 17 illustrates an example of the failed job print screen. The screen illustrated in FIG. 17 displays "Failed Print Job ID" associated with the cloud user UUID.

In S413 to S427, by a user operation, a request for re-performing the print processing is transmitted to the service server 104, and the requested print processing is performed. A printing result is transmitted to the print unit 305. The device on which the print processing is to be performed is identified based on the device ID selected in FIG. 17.

After the print unit 305 confirms that the print processing has been completed, in S1413, the print unit 305 transmits a request for invalidating the user authority for the failed job, together with the print job UUID received in S414, to the authentication unit 303. In S1414, the authentication unit 303 invalidates the cloud user authority to execute the print job identified by the print job UUID. More specifically, the authentication unit 303 deletes the record of the relevant print job from the cloud user failed print job table (see Table 7). The authentication unit 303 also invalidates the local user authority associated with the print job UUID received in S1413. More specifically, the authentication unit 303 deletes the record of the relevant print job from the cloud user failed print job table (see Table 8). The processing for invalidating the local user authority and the processing for invalidating the cloud user authority in S1414 may be performed in any order.

In S1415, the authentication unit 303 transmits a request for invalidating the local user authority for the failed job to the communication control unit 304. This request is for synchronizing information between the local user failed print job table (see Table 8) included in the authentication server 103 and the local user failed print job table (see Table 9) included in the device 105. In this processing, the local user UUID and the failed print job UUID received in S1413, and the device ID identified based on Table 8 are also transmitted.

In S1416, the communication control unit 304 transmits a publish message as a request for invalidating the local user authority for the failed job, together with the local user UUID and the failed print job UUID, to the function call unit 310. The topic in this case is the device ID.

In S1417, the function call unit 310 transmits a request for invalidating the local user authority for the failed job, together with the local user UUID and the print job UUID, to the authentication server cooperation unit 309. In S1418, based on the local user UUID received in S1417, the authentication server cooperation unit 309 updates the data of the local user failed print job table (see Table 9). More specifically, the authentication server cooperation unit 309 deletes the record of the relevant print job from the local user failed print job table. This completes the processing for re-executing a failed print job.

Processing for managing the user authority when the service server 104 fails processing will be described below with reference to FIG. 15 (consisting of FIGS. 15A and 15B). However, similar to the first exemplary embodiment, description will be given centering on a case where the failed processing is the scan upload processing. In the processing that has already been described above, identical processes are assigned the same reference numerals, and the detailed description thereof will be omitted.

After the scan uploading unit 312 acquires the local user authority information in S514, in S1515, the scan uploading unit 312 performs the scan processing and issues the scan upload job identification information. The scan upload job identification information is the UUID, which is a unique value that can uniquely identify a scan upload job.

In S1516, the scan uploading unit 312 transmits a request for performing scan uploading to the function call unit 310. In this processing, the local user UUID, the scan upload job UUID, and the device ID are transmitted together with the scan data acquired in S1515. In S1517, the function call unit 310 transmits the scan data to the communication control unit 304. In this processing, the local user UUID, the device ID, and the scan upload job UUID received in S1516 are also transmitted.

After the communication control unit 304 acquires the cloud user UUID from the authentication unit 303 in S518 to S520, in S1521, the communication control unit 304 transmits a request for storing the scan data to the scan upload unit 306. In this processing, the scan upload job identification information and the scan data received in S1517, and the cloud user UUID acquired in S520 are also transmitted.

After the processing in S522 to S523 and S824 to S837 is performed, in S1522, the scan upload unit 306 fails the processing for storing the scan data. A failure in this processing refers to the scan data storage processing that was not completed because of a mechanical failure on a server.

In S1523, the scan upload unit 306 transmits, to the authentication unit 303, a response to the request for confirming completion of scan uploading. In this processing, the scan upload unit 306 transmits, to the authentication unit 303, a notification of the failure in the scan data storage processing and at the same time transmits thereto the scan upload job UUID received in S1522.

In S1524, the authentication unit 303 invalidates the user authority for the jobs other than the failed job. More specifically, in the cloud user authentication table (see Table 2A), the authentication unit 303 changes the value of "User authority to perform scan upload processing" from "1" to "0". Then, based on the local user UUID received in S837 and Table 3, the authentication unit 303 identifies the cloud user UUID and manages the identified cloud user UUID in association with the record of the failed job. Table 10 illustrates an example of the association information. "Failed upload job UUID" in Table 10 is failed job identification information for uniquely identifying the job of the failed scan upload processing and is issued by the authentication unit 303.

TABLE 10

| Cloud user UUID | Failed scan upload job UUID |
|---|---|
| CCC1 | 90123456 |
| CCC2 | 90123450 |

In S1525, the authentication unit 303 gives the local user authority so that only the job identified by the scan upload job UUID can be executed. More specifically, the authentication unit 303 manages the local user UUID received by the scan upload unit 306 in S837 in association with the failed scan upload job UUID. Table 11 illustrates an example of the association information.

TABLE 11

| Device ID | Local user UUID | Failed scan upload job UUID |
|---|---|---|
| 00001 | AAA1 | 90123456 |
| 00001 | AAA2 | 90123450 |

In S1526, the authentication unit 303 transmits a request for validating the local user authority for the failed job to the communication control unit 304. This request is for synchronizing information between Table 11 and Table 12 (described below). In this processing, the local user UUID, the failed scan upload job UUID, and the device ID are also transmitted.

In S1527, the communication control unit 304 transmits a publish message as a request for validating the local user authority for the failed job, together with the local user UUID and the scan upload job UUID, to the function call unit 310. The topic in this case is the device ID. In S1528, the function call unit 310 transmits a request for validating the local user authority for the failed job, together with the local user UUID and the failed scan upload job UUID, to the authentication server cooperation unit 309.

In S1529, based on the local user UUID received in S1528, the authentication server cooperation unit 309 validates the local user authority for the failed job. More specifically, based on the failed scan upload job UUID received in S1528, the authentication server cooperation unit 309 registers a record in a local user failed scan upload job table (see Table 12) included in the authentication server cooperation unit 309.

TABLE 12

| Local user UUID | Failed scan upload job UUID |
|---|---|
| AAA1 | 90123456 |
| AAA2 | 90123450 |

This completes the processing in which the owner invalidates the user authority to perform the scan upload processing.

Processing for re-performing failed scan upload processing will be described below with reference to FIG. 16 (consisting of FIGS. 16A and 16B). In the processing that has already been described above, identical processes are assigned the same reference numerals, and the detailed description thereof will be omitted.

After the user logs into the device 105 in S501 to S504, in S1606, the web browser 307 receives from the user an operation for requesting the failed job scan upload screen for re-entering the scan upload failed job. In S1607, the web browser 307 transmits a request for the failed job scan upload screen, together with the local user UUID, to the scan uploading unit 312.

In S1608, the scan uploading unit 312 transmits a request for acquiring the local user authority information for scan uploading to the authentication server cooperation unit 309. More specifically, the authentication server cooperation unit 309 confirms the local user authority information based on the authority table (see Table 4). When the local user authority is invalidated, the authentication server cooperation unit 309 further refers to the table illustrated in Table 12. Referring to Table 12, the existence of the failed scan upload job UUID for the local user UUID generated in S504 means that the local user authority is validated only for the scan upload job.

In S1609, the authentication server cooperation unit 309 transmits the local user authority information to the scan uploading unit 312. In S1610, based on the local user authority information acquired in S1609, the scan uploading unit 312 transmits the failed job scan upload screen to the web browser 307. FIG. 19 illustrates an example of the scan upload screen. This time, the user who logged into the device 105 in S501 has the local user UUID "AAA1". Referring to Table 12, the failed scan upload job UUID "90123456" exists for the local user UUID "AAA1". In the screen illustrated in FIG. 19, the failed scan upload job UUID "90123456" and the associated scan data "aaaaa.pdf" are displayed.

In S1611, the web browser 307 receives an operation for requesting scan uploading from the user. More specifically, referring to FIG. 19, the user checks the "Selection" column to select a specific job UUID and presses the "Upload" button. As a result of the selection operation in FIG. 19, in S1612, the web browser 307 transmits a request for scan uploading to the scan uploading unit 312. In this processing, the scan upload job UUID is also transmitted. In S1613, the scan uploading unit 312 transmits a request for acquiring the local user authority information to the authentication server cooperation unit 309. In this processing, the failed scan upload job UUID is also transmitted.

Based on the transmitted failed scan upload job UUID and Table 12, the authentication server cooperation unit 309 identifies the local user UUID and confirms whether the local user authority information is given to the local user UUID based on Table 4. Referring to Table 4, the local user authority information for scan uploading is given to the local user UUID "AAA1". Therefore, in S1614, the authentication server cooperation unit 309 transmits the local user authority information to the scan uploading unit 312. When the invalidity of the local user authority is confirmed, the authentication server cooperation unit 309 transmits an error to the web browser 307 in S1614.

After the local user authority is confirmed to be given in S1614, in S1615, the scan uploading unit 312 transmits a request for scan uploading to the function call unit 310. In this processing, the scan upload job UUID is also transmitted. In S1616, the function call unit 310 transmits the local user UUID, the device ID, the scan upload job UUID, and the scan data, to the communication control unit 304.

In S1617, the function call unit 310 transmits a notification of completion of the scan upload processing to the scan uploading unit 312. In S1618, the scan uploading unit 312 transmits a request for invalidating the local user authority for the failed job to the authentication server cooperation unit 309. In this processing, the failed scan upload job UUID is also transmitted.

In S1619, the authentication server cooperation unit 309 invalidates the local user authority for the failed job. More specifically, based on the scan upload job UUID received in S1618, the authentication server cooperation unit 309 deletes the job record from Table 12. After deleting the job record, in S1620, the authentication server cooperation unit 309 transmits a response to the request in S1618 to the scan uploading unit 312.

Processing in S1621 to S1627 is similar to the processing in S518 to S524, and the detailed description thereof will be omitted. Thus, only the differences in S1623 and S1628 to S1629 will be described below as supplementary information.

After acquiring the cloud user UUID from the authentication unit 303, in S1623, the communication control unit 304 transmits a request for storing the scan data to the scan upload unit 306. In this processing, the scan data and the failed scan upload job UUID received in S1616 are also transmitted.

In S1628, the scan upload unit 306 transmits a request for invalidating the user authority for the failed job, to the authentication unit 303. In this processing, the scan upload job UUID is also transmitted. In S1629, the authentication unit 303 invalidates the user authority for the failed job. More specifically, the authentication unit 303 deletes the record of the relevant job from Tables 10 and 11. The processing of deletion in Table 10 and that in Table 11 may be performed in any order. This completes the processing for re-performing failed scan upload processing.

According to the second exemplary embodiment, the user authority is managed by using identification information for identifying a failed job in addition to the user authority information for performing processing. Therefore, even if processing for a request received immediately before invalidating the user authority fails, only the failed processing can be re-performed.

Although, in the above-described sequences, the owner accesses the authority control screen and invalidates the user authority by using a web browser, the processing is not limited thereto. The user authority may be automatically invalidated on a time basis or by using a usage condition of the user as a trigger. A third exemplary embodiment will be described below centering on a configuration in which the user authority is automatically invalidated and the owner does not need to perform manual operations on the owner device 106. Portions not described in the third exemplary embodiment are similar to those according to the first and the second exemplary embodiments. Although the present exemplary embodiment will also be described below centering on printing and scan uploading, the processing is not limited thereto.

Processing in a case where there is provided a validity period during which the print function can be used will be described below. The function of managing the validity period is included in the print unit 305. More specifically, the print unit 305 manages the present time and a preset validity period and determines whether the validity period has expired through the comparison between them.

When the validity period is determined to have expired as a result of comparison between them, in S1700, the print unit 305 transmits a request for invalidating the cloud user authority to the authentication unit 303. In S1701, the authentication unit 303 performs processing for invaliding the cloud user authority. Processing in S1701 and the subsequent operations is similar to the processing in S727 and the subsequent operations, respectively. When the validity of the cloud user authority information has been confirmed in S416 before the processing in S1701, in S416.5 to S430, the print processing is performed. Then, after the print processing is confirmed to have been completed in S729, in S730 to S734, the local user authority is invalidated.

On the other hand, the validity period of the scan upload function is managed by the scan upload unit 306. When the validity period is determined to have expired, in S1710, the scan upload unit 306 transmits a request for invalidating the local user authority to the authentication unit 303. In S1711, the authentication unit 303 performs the processing for invalidating the local user authority. Processing in S1711 and the subsequent operations is similar to the processing in S829 and the subsequent operations. The processing in S833 prevents reception of a new request for scan uploading on and after the expiration date of the validity period. When the validity of the local user authority information has been confirmed in S514 before the processing in S833, in S515 to S523, the scan upload processing is performed. Then, after the scan upload processing is confirmed to have been completed in S838, in S839, the cloud user authority is invalidated. This completes the processing for automatically invalidating the user authority when the validity period is provided.

Next, processing in a case where there is provided a limitation on the number of sheets to be printed by the print function, is described. The function of managing the number of printed sheets is included in the print unit 305. More specifically, when the print unit 305 receives a request for cloud printing in S414, in S1800, the print unit 305 adds the number of printed pages (number of sheets) included in the request for cloud printing in S414 to the number of printed sheets at the time of reception of the request. When the number of sheets after the addition exceeds the limitation on the number of sheets, the print unit 305 notifies the user of an error.

For example, when the print unit 305 receives a request for cloud printing for "Printing on 6 sheets" in S1800, the print unit 305 adds 6 to the number of printed sheets "95". Since the number of sheets "101" after the addition is greater than "100" (upper limit number of sheets), the user is notified of an error. Instead of notifying the user of an error, printing may be performed as long as the upper limit number of sheets is not exceeded. For example, in order not to exceed the upper limit number "100", only 5 sheets out of 6 sheets specified in a print request may be printed.

If an error does not occur in S1800, processing similar to the processing in S415 to S420 is performed. Then, in S421, the communication control unit 304 transmits a publish message to the function call unit 310. After the processing in S421 is completed, the communication control unit 304 transmits, to the print unit 305, a notification that a request for cloud printing has been transmitted to the device 105. Based on the notification, in S1801, the print unit 305 adds the number of printed sheets (record). When the number of sheets after the addition in S1801 reaches the upper limit number of sheets, in S1802, the print unit 305 transmits a request for removing the cloud user authority to the authentication unit 303. Processing in S1802 and the subsequent operations is similar to the processing in S728 and the subsequent operations. This completes the processing for invalidating the user authority when the upper limit number of sheets is provided.

In addition to the configuration according to the present exemplary embodiment, the user authority may be given and invalidated, for example, through the execution of Application Programming Interfaces (APIs) offered by the authentication unit 303.

Although, in the above-described exemplary embodiments, the processing for invalidating the user authority is performed based on the validity period and the upper limit number of sheets, the upper limit number of sheets may be provided, for example, through fee collection.

Other Embodiments

According to the above-described exemplary embodiments, the invalidation and giving of the user authority for scan uploading and the user authority for printing have been described with reference to different sequence diagrams for the convenience of description. However, the mode of processing is not limited thereto. Processing for invalidating and giving the user authority for scan uploading and the user authority for printing may be performed through a single operation on the authority control screen (see FIGS. 11A and 11B).

Embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that various embodiments are not limited to the disclosed exemplary embodiments. The scope of the following claims is to be accorded the broadest interpretation so as to encompass all such modifications and equivalent structures and functions.

This application claims priority to Japanese Patent Application No. 2017-221287, which was filed on Nov. 16, 2017 and which is hereby incorporated by reference herein in its entirety.

What is claimed is:

1. An information processing system, including an image forming apparatus including at least a print function and a scan function, and a service server, for managing a local user authority for a user to use functions of the image forming apparatus and a cloud user authority for the user to use functions of the service server, the information processing system comprising:
  one or more processors; and
  at least one memory, in communication with the one or more processors, having stored thereon instructions that are executable by the one or more processors, and cooperating with the one or more processors to act as:
    a first reception unit configured to enable the service server to receive a first request for performing print processing through a cooperation between the service server and the image forming apparatus by the user;
    a first execution unit configured to enable the service server to perform the print processing based on the first request when the validity of the cloud user authority is confirmed;
    a first invalidation unit configured to invalidate a cloud user authority to use a print function in a case where a request for invalidating a user authority to perform the print processing is received by the service server;
a first confirmation unit configured to confirm that the print processing based on the first request received by the first reception unit has been performed by the image forming apparatus; and
a second invalidation unit configured to invalidate a local user authority to use the print function in a case where the request for invalidating the user authority to perform the print processing is received by the service server;
wherein the second invalidation unit does not invalidate the local user authority in conjunction with invalidation of the cloud user authority, does not invalidate the local user authority until a notification indicating that the print processing is completed is received from the first confirmation unit, and does invalidate the local user authority after the notification is received from the first confirmation unit.

2. The information processing system according to claim 1, further comprising a first management unit configured to manage first information in which local user authentication information for uniquely identifying the user that uses functions of the image forming apparatus is associated with a setting value indicating whether the local user authority is invalidated, and second information in which cloud user authentication information for uniquely identifying the user using functions of the service server is associated with a setting value indicating whether the cloud user authority is invalidated,
wherein the first management unit changes the setting value managed by the first management unit to a setting value indicating that the authority is invalidated for the invalidation.

3. The information processing system according to claim 1, further comprising:
a first issuing unit configured to issue first failed job identification information for identifying the print processing failed; and
a second issuing unit configured to issue second failed job identification information for identifying scan processing failed,
wherein, in a case where the cloud user authority is confirmed to be associated with the first failed job identification information issued by the first issuing unit, processing identified by the first failed job identification information is performed regardless of the setting value indicating whether the cloud user authority is invalidated, and
wherein, in a case where the local user authority is confirmed to be associated with the second failed job identification information issued by the second issuing unit, processing identified by the second failed job identification information is performed regardless of the setting value indicating whether the local user authority is invalidated.

4. The information processing system according to claim 3,
wherein, in a case where processing for performing the print function fails, the first issuing unit receives first job identification information for identifying the processing for performing the print function and issues failed job identification information for identifying failed processing for the first job identification information received, and
wherein, in a case where processing for performing a scan function fails, the second issuing unit receives second job identification information for identifying the processing for performing the scan function and issues failed job identification information for identifying failed processing for the second job identification information received.

5. The information processing system according to claim 3, wherein, after the processing identified by the first or the second failed job identification information is confirmed to have been performed, the cloud user authority or the local user authority associated with the first or the second failed job identification information is deleted.

6. The information processing system according to claim 3, further comprising a first display unit configured to display a screen for selecting processing to be re-performed,
wherein, after cloud user authority information is confirmed to be associated with the first failed job identification information selected by the user in a screen displayed by the first display unit or after local user authority information is confirmed to be associated with the second failed job identification information selected by the user in the screen displayed by the first display unit, the processing identified by the first or the second failed job identification information selected in a re-execution screen is re-performed.

7. The information processing system according to claim 1, wherein the invalidation refers to processing for invalidating the authority.

8. The information processing system according to claim 1, further comprising:
a second management unit configured to manage a limitation on execution of the print or a scan function; and
a determination unit configured to determine whether the limitation managed by the second management unit is reached,
wherein the invalidation refers to invalidating an authority to perform a function which has reached the limitation in a case where the determination unit determines that the limitation is reached.

9. The information processing system according to claim 1, wherein, in a case where an authority for the user to use the print function is invalidated, the information processing system notifies the user of an error.

10. The information processing system according to claim 8, wherein the limitation is either one of the number of sheets to be printed when the print function is performed and a validity period during which the user can use the function.

11. The information processing system according to claim 10, wherein, the determination unit determines whether the number of sheets to be printed by the first request already received exceeds the limitation and, in a case where the limitation is determined to be exceeded, the determination unit notifies the user of an error.

12. A control method for causing a computer to function as an information processing system, including an image forming apparatus and a service server, for managing a local user authority for a user to use functions of the an image forming apparatus and a cloud user authority for the user to use functions of the service server, the method comprising:
enabling the service server to receive a first request for performing print processing through a cooperation between the service server and the image forming apparatus by the user;
enabling the service server to perform the print processing based on the first request when the validity of the cloud user authority is confirmed;

invalidating a cloud user authority to use a print function in a case where the service server receives a request for invalidating a user authority to perform the print processing;

confirming that the print processing based on the first request has been performed by the image forming apparatus; and invalidating a local user authority to use the print function in a case where the request for invalidating the user authority to perform the print processing is received by the service server, wherein the invalidating does not invalidate the local user authority in conjunction with invalidation of the cloud user authority, does not invalidate the local user authority until a notification indicating that the print processing is completed is received, and does invalidate the local user authority after the notification indicating that the print processing is completed is received.

13. An information processing system, including an image forming apparatus and a service server, for managing a local user authority for a user to use functions of the image forming apparatus and a cloud user authority for the user to use functions of the service server, the information processing system comprising:

one or more processors; and at least one memory, in communication with the one or more processors, having stored thereon instructions that are executable by the one or more processors, and cooperating with the one or more processors to act as:

a second reception unit configured to enable the image forming apparatus to receive a second request for performing a scan function through a cooperation between the service server and the image forming apparatus by the user;

a second execution unit configured to enable the image forming apparatus to perform scan processing based on the second request when the validity of the local user authority is confirmed;

a third invalidation unit configured to invalidate a local user authority to use the scan function in a case where the image forming apparatus receives a request for invalidating a local user authority to perform the scan processing;

a second confirmation unit configured to confirm that the scan processing based on the second request received by the second reception unit has been performed by the service server; and a fourth invalidation unit configured to invalidate a cloud user authority to use the scan function in a case where the request for invalidating the local user authority to perform the scan processing is received by image forming apparatus, wherein the fourth invalidation unit does not invalidate the cloud user authority in conjunction with invalidation of the local user authority, does not invalidate the cloud user authority until a notification indicating that the scan processing is completed is received from the second confirmation unit, and does invalidate the cloud user authority after the notification is received from the second confirmation unit.

* * * * *